United States Patent [19]
Hamada et al.

[11] Patent Number: 5,596,695
[45] Date of Patent: Jan. 21, 1997

[54] INTERACTIVE MULTI-MEDIA EVENT-DRIVEN INHERITABLE OBJECT ORIENTED PROGRAMMING APPARATUS AND METHOD

[75] Inventors: Hiroyuki Hamada, Hirakata; Kiyomi Sakamoto, Ikoma, both of Japan

[73] Assignee: Matsushita Electric Industrial Co., Ltd., Osaka, Japan

[21] Appl. No.: 912,179

[22] Filed: Jul. 13, 1992

[30] Foreign Application Priority Data

Jul. 12, 1991 [JP] Japan .................................. 3-172509
Jan. 30, 1992 [JP] Japan .................................. 4-015143
Apr. 28, 1992 [JP] Japan .................................. 4-109456

[51] Int. Cl.⁶ .................................................. G06F 9/455
[52] U.S. Cl. .......................... 395/333; 395/967; 395/966; 395/952
[58] Field of Search .................................. 395/152, 154, 395/160

[56] References Cited

U.S. PATENT DOCUMENTS

| | | | |
|---|---|---|---|
| 4,962,463 | 10/1990 | Crossno et al. | 395/154 |
| 5,025,394 | 6/1991 | Parke | 395/152 |
| 5,025,395 | 6/1991 | Nose et al. | 395/154 |
| 5,111,409 | 5/1992 | Gasper et al. | 395/152 |
| 5,148,154 | 9/1992 | MacKay et al | 395/154 X |
| 5,204,947 | 4/1993 | Bernstein et al. | 395/154 X |
| 5,212,792 | 5/1993 | Gerety et al. | 395/650 |
| 5,237,648 | 8/1993 | Mills et al. | 395/152 X |
| 5,257,369 | 10/1993 | Skeen et al. | 395/650 |
| 5,261,041 | 11/1993 | Susman | 395/152 |
| 5,287,446 | 2/1994 | Williams et al. | 395/152 |
| 5,317,685 | 5/1994 | Morimura et al. | 395/152 |
| 5,359,703 | 10/1994 | Robertson et al. | 395/152 X |
| 5,384,667 | 1/1995 | Beckwith | 395/152 X |

OTHER PUBLICATIONS

Greenberg, GPSS Primer, 1972, pp. 10–14, 23–27.

*Primary Examiner*—Heather R. Herndon
*Assistant Examiner*—Anton W. Fetting
*Attorney, Agent, or Firm*—Wenderoth, Lind & Ponack

[57] ABSTRACT

Stored data denotes a plurality of objects each composed of a pair of a data part containing presentation information of at least one of text, graphics, image, video and sound and a processing procedure part containing a procedure for processing the presentation information in the data part. Spatial allocation and moving statuses of the plurality of objects are controlled and a status change is detected in which one arbitrary object and another arbitrary object come to a predetermined specific relation to each other. A status change command is generated responsive to a detected status change and to a timer interrupt signal. Execution of the plural data objects according to the processing procedure part and input parameters is then controlled so as to change a status of at least one of the plurality of objects in accordance with the status change command.

2 Claims, 21 Drawing Sheets

FIG. 12 mainframe:

| | | | |
|---|---|---|---|
| Create SL_hontai | As Image | ItsParent mainframe | ...(1) |
| Create SL_bar | As Image | ItsParent mainframe | ...(2) |
| Create SL_wheel_fwrd | As Image | ItsParent mainframe | ...(3) |
| Create SL_wheel_back | As Image | ItsParent mainframe | ...(4) |

SL = SL_hontai + SL_bar + SL_wheel_fwrd + SL_wheel_back    ...(5)
Create Kyakusya_hontai          As Image   ItsParent mainframe ...(6)
Create Kyakusya_wheel_fwrd      As Image   ItsParent mainframe ...(7)
Create Kyakusya_wheel_back      As Image   ItsParent mainframe ...(8)
Kyakusya = Kyakusya_hontai + Kyakusya_wheel_fwrd
                             + Kyakusya_wheel_back    ...(9)
Old_densya = SL + Kyakusya                             ...(10)
Create Shinkansen_hontai        As Image   ItsParent mainframe ...(11)
Create Shinkansen_wheel_fwrd    As Image   ItsParent mainframe ...(12)
Create Shinkansen_wheel_back    As Image   ItsParent mainframe ...(13)
Shinkansen = Shinkansen_hontai + Shinkansen_wheel_fwrd
                              + Shinkansen_wheel_back ...(14)
Create man1                     As Image   ItsParent mainframe ...(15)
Create man2                     As Image   ItsParent mainframe ...(16)
Create ball1                    As Ball    ItsParent mainframe ...(17)
Create ball2                    As Ball    ItsParent mainframe ...(18)
Create Speedmeter1              As Scale   ItsParent mainframe ...(19)
Create Speedmeter2              As Scale   ItsParent mainframe ...(20)
Create start1                   As Button  ItsParent mainframe ...(21)
Create start2                   As Button  ItsParent mainframe ...(22)
Create geton1                   As Button  ItsParent mainframe ...(23)
Create geton2                   As Button  ItsParent mainframe ...(24)
Create getoff1                  As Button  ItsParent mainframe ...(25)
Create getoff2                  As Button  ItsParent mainframe ...(26)
man&ball1 = man1 + ball1                               ...(27)
man&ball2 = man2 + ball2                               ...(28)

FIG. 13 geton1:

On MouseDown
    Old_densya = Old_densya + man&ball1                    ...(29)
End MouseDown

FIG. 14 geton2:

On MouseDown
    Shinkansen = Shinkansen + man&ball2     ... (30)
End MouseDown

FIG. 15 start1:

On MouseDown
    Move Old_densya Speed v1(t)     ... (31)
End MouseDown

FIG. 16

Old_densya: , Shinkansen

On Move
    if Getx of Old_densya = Getx of Shinkansen     ... (32)
      Move man1 To left     ... (33)
      Move man2 To right     ... (34)
      Move ball1 To up     ... (35)
      Move ball2 To down     ... (36)
    end if     ... (37)
End Move

FIG. 17 man1:

On Move
    if Getx of man1 = 0     ... (38)
      Stop man1     ... (39)
      Stop ball1     ... (40)
      Stop Old_densya     ... (41)
    end if     ... (42)
End Move

FIG. 18 man2:

On Move
   if Getx of man2 = 0    ...(43)
      Stop man2    ...(44)
      Stop ball2    ...(45)
      Stop Shinkansen    ...(46)
   end if    ...(47)
End Move

FIG. 20 mainframe:

| | | | | | |
|---|---|---|---|---|---|
| Create | a ball | Named | Sun | ItsParent mainframe | ...(51) |
| Create | a ball | Named | earth | ItsParent mainframe | ...(52) |
| Create | a ball | Named | meteo | ItsParent mainframe | ...(53) |
| Locate | Sun | To | 200 200 | | ...(54) |
| Locate | Earth | To | 300 200 | | ...(55) |
| Locate | meteor | To | 400 0 | | ...(56) |
| ChangeColor | Sun | To | yellow | | ...(57) |
| ChangeColor | earth | To | blue | | ...(58) |
| ChangeColor | meteor | To | brown | | ...(59) |

FIG. 21 earth:

On Mainframe End
   move     earth     Along     circle centered Sun radius 100 ...(60)
End MainframeEnd On MouseDown
   move     meteo     Along     g(t)     ...(61)
End MouseDown

FIG. 22 earth:

| | | | |
|---|---|---|---|
| On collision | meteor and earth | | |
| position = getposition of meteor | | | . . . (62) |
| Delete | meteor | | . . . (63) |
| Delete | earth | | . . . (64) |
| Create | 10 ball Named | asteroid?? ItsParent mainframe | . . . (65) |
| Locate | asteroid?? | to position | . . . (66) |
| move | asteroid?? | Along radial centered position angle ?*36 | . . . (67) |

End Collision

FIG. 26 earth:

On MouseDown
    move    meteor    Along    velocity = 100    . . . (70)
End MouseDown On MouseDown
    move    earth    Along    velocity = 200    . . . (71)
End MouseDown

INTERACTIVE MULTI-MEDIA EVENT-DRIVEN INHERITABLE OBJECT ORIENTED PROGRAMMING APPARATUS AND METHOD

BACKGROUND OF THE INVENTION

1. Field of the Invention

The invention relates to information presentation apparatus and presentation information creating apparatus used for support of development and presentation of the presentation software controlled by the time, such as the audiovisual educational software and amusement software.

2. Description of the Prior Art

The conventional information presentation apparatus and presentation information creating apparatus using the time control means were designed to create or present the information by the combination of source information. That is, as the unit for presenting information, an electronic film and its set were used, and a plurality of source information was adhered on the electronic film to create the presentation information, and the time control in presentation was executed keeping pace with the progress of the electronic film. More specifically, for example, when creating an animation having a simulation property such as educational support for dynamics or mathematics, the position of the object as the item to be presented is preliminarily determined by calculation or other means, and video images and others are created depending on the result, and are assembled together. In this case, for example, when creating an animation expressing a collision Of two objects, the collision time of the two objects is first determined, and the positions of the objects changing moment by moment are calculated by using different formulae before and after the collision time, and video images are composed on the basis of the calculation results and are combined. For instance, when creating the presentation information for starting the source image along with the increase of the sound volume level of the source sound, such timing is measured beforehand, and the control information is issued at the specific time matching with the timing. On the other hand, an interactive description for interactive presentation is done by the simple branch on the time axis and the condition branch, and the presentation information is changed over depending on the manipulation. That is, preliminarily assuming interactive manipulations, the presentation information corresponding to each manipulation is created, and merely the presentation information is selected depending on the actual manipulation.

Besides, in the conventional information presentation apparatus having the time control means, as a unit for presenting the information, an electronic film sliced on only one absolute time axis common to all information and a set of films are used, and the information is adhered to the film and presented, and on the time axis, the display time and the delay time are controlled, and the interactive description is often done by the simple branch on the time axis and control branch.

A conventional information presentation apparatus is composed, for example, as shown in FIG. 23. In FIG. 23, numeral 1 denotes an information presentation apparatus, 17 is a timer generating means for generating events at every specific interval, 22 is a data control means for controlling the information data, 5 is a time control means for controlling the, time attribute of the data, 4 is an interpretation execution means for interpreting and executing the processing procedure, 21 is an initial setting execution means for creating application window and the like for presenting the information, 9 is an output control means for controlling the output to the video output device for information presentation, 19 is a space control means for controlling the space attribute of the data, 2 is an interactive processing input means for feeding parameters necessary for interactive processing for information presentation, 6 is an event control means for controlling the events entered from interactive processing input means or timer generating means, 7 is an information presentation execution means for controlling the execution of the entire information presentation apparatus, and 2301 through 2316 are signal lines indicating control signals, commands, data and others, in which the information is presented in the following actions.

To begin with, the initial setting execution means 21 makes an initial setting, and creates an application window. Then the control is transferred to the information presentation execution means 7, and the information presentation execution means 7 sends a control signal 2313 to the data control means 22, urging to show the data to be presented next. The data control means 22 sends control signals 2302, 2304 to the time control means 5 and space control means 19, and obtains the time and space attributes of the data to be presented next. The data control means 22 sends the data to be presented next and its attributes to the information presentation execution means 7. The information presentation execution means 7 transfers them to the output control means 9, and the output control means 9 presents information. Again, the control is returned to the information presentation execution means 7, and the same action is repeated.

In this period, when an event input is entered by the user through the interactive processing input means 2, the event control means 6 receives the event, and transfers a control signal 2312 to the information presentation execution means 7. Upon receiving the control signal 2312, the information presentation execution means 7 requests the execution of a script to the interpretation execution means 4. The interpretation execution means 4 interprets the script, and requests the execution to the timer generating means 17, information presentation execution means 7, or output control means 9 depending on the command.

The information is thus presented, but as for the time and space control of the data, since only absolute time and space control is effected, and since the timer that can be generated by the timer generation means is only one, the expression ability is limited. Meanwhile, the conventional information presentation apparatus was not designed in consideration of the real time processing, and no consideration was given, for example, to the flexible change of order of information presentation and priority rank depending on the drawing speed and drawing quantity of the objects in an animation, specification of the processing unit of each object, and adjustment of timer interrupt interval for controlling the timing of drawing. Accordingly, if a gap is caused between the information presentation speed specified by the user and the information presentation speed actually executed by the apparatus, any mechanism for correcting or revising it is not provided. The end user cannot easily define a new class, a new object attribute, or a class hierarchical relation. In the existing information presentation apparatus, yet, there is no mechanism for efficiently storing and controlling the multimedia information of text, graphics, image, video and sound.

In the conventional information presentation apparatus and presentation information creating apparatus, since the source information is adhered on an electronic film, and the presentation information is created or presented, it is necessary to directly specify the source information and mutual relation of the presentation objects, and it is difficult to present by combining plural pieces of source information possessing complicated mutual relations.

In addition, the time control flows sequentially along the progress of the film, and the interactive operation is realized by changing over the presentation information depending on the branch, and hence it is not possible to present the information by allowing the object of presentation to behave freely on the time space depending on the interactive manipulation, for example.

Hitherto, either the interactive software like hypertext without considering the time axis control, or the video editing type software along the absolute time like a CM film was used. It was, therefore, difficult to develop more than the simple information presentation of changing over several predetermined patterns by dialog with the viewer. It was also difficult to develop a software for expressing the mutually related information, that is, describing information on relative time space.

In such constitution, since the information is controlled in the unit of an electronic film, it is difficult to describe the relative change in time and space of plural pieces of information behaving with mutual relationship, and since the control is not effected in the unit of each information, it is difficult to describe the mutual action between pieces of information, and the time control flows sequentially along with the progress of the electronic film, which makes it extremely difficult to describe the free behavior of the interactive information on time and space.

Incidentally, since the scenario of presentation software is composed on the basis of an electronic film model, the content of the presentation cannot surpass the conventional film.

In addition, since the real time processing is not taken into consideration, there is no provision for flexible change of sequence of information presentation or priority rank depending on the drawing speed and drawing quantity of objects in, for example, an animation, and no adjustment to specification of processing unit of each object, and timer interrupt interval for controlling the timing of drawing. That is, if a gap is caused between the information presentation speed designated by the user and the information presentation speed actually executed by the apparatus, there is no mechanism for correcting or revising it, and there is a limitation for creation and execution of an animation which requires real time processing.

The end user cannot easily define a new class, a new object attribute, or a class hierarchical relation, and there is a limitation from the viewpoint of extendability of the system, and recycling of animation parts once created.

SUMMARY OF THE INVENTION

In the light of the above problems, it is hence a primary object of the invention to present an information presentation apparatus and a presentation information creating apparatus capable of easily creating or presenting a presentation information by combining plural pieces of source information possessing complicated mutual relations, and allowing the presentation object to behave freely on time space depending on the interactive manipulations.

It is other object of the invention to present an apparatus possessing the mechanism for relative time control and time space control which were very difficult in the conventional information presentation apparatus, and also possessing the mechanism for easily describing the behavior of the interactive information on time space and mutual actions between pieces of information, thereby permitting to efficiently develop a presentation software for simulation purposes.

It is a different object of the invention to present an information presentation apparatus and a presentation information creating apparatus possessing the mechanism for control of real time processing which was difficult in the conventional information presentation apparatus, thereby executing animation more precisely.

It is another object of the invention to present an apparatus possessing the mechanism for allowing the end user to define easily a new class, a new object attribute and a class hierarchical relation which were extremely difficult in the conventional information presentation apparatus, so that system extension and recycling of animation parts once created may be easy.

It is a further different object of the invention to present an information presentation apparatus possessing the mechanism for efficiently storing and controlling the multimedia information of text, graphics, images, video and sound.

To achieve the above objects, the first invention presents an information presentation apparatus comprising a data part showing the presentation information about at least one of text, graphics, image, video and sound, a plurality of objects composed of a set with a processing procedure part for defining the behavior of the data part on time space, object storage means for storing the presentation conditions of presentation information, object control means for controlling the status of the objects, and event control means for receiving a change event of the object status issued by the object control means, and processing depending on the change event, wherein while the object control means detects that one arbitrary object and other arbitrary object have come to a specific relation and outputs the change event, the event control means receives the change event, and changes the status of at least one of the plural objects.

The second invention presents an information presentation apparatus comprising a data part showing the presentation information about at least one of text, graphics, image, video and sound, a plurality of objects composed of a set, with a processing procedure part for defining the behavior of the data part on time space, an object storage means for storing the presentation conditions of presentation information, and conditions about presentation information concerning the communication status with an external system of the information presentation apparatus, an object control means for controlling the status of the objects, and an event control means for receiving a change event of the object status issued by the object control means, and processing depending on the change event, wherein while the object control means detects that one arbitrary object and other arbitrary object have come to a specific relation and outputs the change event, the event control means receives the change event, and changes the status of at least one of the plural objects.

The third invention presents, in addition to the first invention, an information presentation apparatus comprising time control means for controlling the time of the information presentation by receiving the time control command issued from the object control means, wherein the event control means receives the timer interrupt event issued from the time control means, and the change event of the object status issued from the object control means, and processes according to the change event.

The fourth invention presents, in addition to the first invention, an information presentation apparatus further comprising an interpretation execution means for interpreting and executing the processing procedure part described in the object and the presentation conditions, wherein the interpretation execution means interprets the processing procedure part of the pertinent object and presentation conditions, and requests execution to the object control means or event control means depending on the processing procedure part and type of presentation conditions.

The fifth invention presents, in addition to the first invention, an information presentation apparatus comprising an interactive processing input means for entering necessary parameters for interactive processing of information presentation, wherein the interactive processing input means receives an interactive input from the user, and issues an event to the event control means.

The sixth invention presents, in addition to the first invention, an information presentation apparatus, wherein the object storage means comprises data part storage means for storing the data part and basic instruction group, and procedure part storage means for storing the procedure processing part and the presentation conditions.

The seventh invention presents, in addition to the sixth invention, an information presentation apparatus, wherein the data part and basic instruction group are stored in the data part storage means by classifying and stratifying them depending on the attribute of the data, and the object control means possesses a class inheritance means for referring to the higher class if a desired basic instruction is not found in the lower class.

The eighth invention presents an information presentation apparatus comprising a timer generating means for interrupting at every specific interval, an information shielding means called an object composed of a set of information data part and procedure part for processing it and possessing a hierarchical structure, an object control means possessing the function of class inheritance control of the object, function of parental inheritance control of the object and function of hierarchical control of the object, and a time control means possessing the time control functional formula for describing the time changes of the object, wherein the timer generating means is controlled by the time control means on the basis of the time control functional formula, the time control functional formula and the hierarchical structure of the object are changed by the object control means, and this change is inherited by the function of the parental inheritance control, thereby effecting the relative time control of the information.

The ninth invention presents, in addition to the eighth invention, an information presentation apparatus comprising a space configuration control means possessing space configuration control functional formula for describing the space changes of the object, wherein the space control functional formula and hierarchical structure of the object are changed by the object control means, and this change is inherited by the function of the parental inheritance control, thereby effecting the relative space control of the information.

The tenth invention presents, in addition to the eighth invention, an information presentation apparatus, wherein the object control means is composed of an information shielding means called an object consisting of a set of data part of information and a procedure part for processing it and possessing a hierarchical structure, and an object control means possessing the function for class inheritance control of the object, the function for parental inheritance control of the object, and the function for hierarchical control of the object, and the time control means is composed of a timer generating means for interrupting at every specific interval and a time control means possessing the time control functional formula for describing time changes of the object, wherein, the timer generating means is controlled by the time control means on the basis of the time control functional formula, the time control functional formula and the hierarchical structure of the object are changed by the object control means, and this change is inherited by the function of the parental inheritance control, thereby effecting the relative time control of the information.

The eleventh invention presents, in addition to the tenth invention, an information presentation apparatus comprising a space configuration control means possessing the space configuration control functional formula for describing the space changes of the object, wherein the space control functional formula and hierarchical structure of the object are changed by the object control means, and this change is inherited by the function of the parental inheritance control, thereby effecting the relative space control of the information.

The twelfth invention presents a presentation information creating apparatus for interactively creating the software for information to be presented, depending on the interactive manipulation of plural objects combining plural pieces of source information, comprising:

an object storage means for storing a plurality of objects composed of a set of a data part showing the presentation information about at least one of text, graphics, image, video and sound, and a processing procedure part for specifying the behavior of the data part on the time space, and presentation conditions of presentation information, an object control means for controlling the status of the objects, an event control means for receiving a change event of the object status issued from the object control means, and processing according to the change event, a data part input means for entering the data part, and a processing procedure part input means for entering the processing procedure part, wherein while the object control means detects that arbitrary object and other arbitrary object have come to a specific relation and outputs the change event, the event control means receives the change event, and changes the status of at least one of the plural objects.

The thirteenth invention presents a presentation information creating apparatus for interactively creating the software for information to be presented, depending on the interactive manipulation of plural objects combining plural pieces of source information, comprising:

an object storage means for storing a plurality of objects composed of a set of a data part showing the presentation information about at least one .of text, graphics, image, video and sound, and a processing procedure part for specifying the behavior of the data part on the time space, presentation conditions of presentation information, and the conditions concerning the information presentation about the communication status with an external system of the presentation information creating apparatus, an object control means for controlling the status of the objects, an event control means for receiving a change event of the object status issued from the object control means, and processing according to the change event, a data part input means for entering the data part, and a processing procedure part input means for entering the processing procedure part, wherein while the object control means detects that one arbitrary object and other arbitrary object have come to a specific relation and outputs the change event, the event control means receives the change event, and change the status of at least one of the plural objects.

The fourteenth invention presents, in addition to the twelfth invention, a presentation information creating apparatus further comprising a time control means for controlling the time control of the information presentation by receiving the time control command issued from the object control means, wherein the event control means receives the timer interrupt event issued from the time control means, and the change event of the object status issued from the object control means, and processes according to the change event.

The fifteenth invention presents, in addition to the fourteenth invention, a presentation information creating apparatus comprising a time information storage means for storing the time control information for information presentation by receiving the time control instructions issued from the event control means and object control means, and a time information adjusting means for adjusting the information stored in the time information storage means coinciding with the execution status of the information presentation, wherein the apparatus functions under the control of the time control means.

The sixteenth invention presents, in addition to the twelfth invention, a presentation information creating apparatus further comprising an interpretation execution means for interpreting and executing the processing procedure part described in the object and the presentation conditions, wherein the interpretation execution means interprets the processing procedure part of the pertinent object and presentation conditions, and requests execution to the object control means or even control means depending on the processing procedure part and type of presentation conditions.

The seventeenth invention presents, in addition to the sixteenth invention, a presentation information creating apparatus comprising an intermediate language converting means for converting the processing procedure part described in a simplified language and the presentation conditions into an intermediate language, and storage means for storing the converted intermediate language information, wherein the stored intermediate language information is executed successively.

The eighteenth invention presents, in addition to the twelfth invention, a presentation information creating apparatus further comprising an interactive processing input means for entering parameters necessary for interactive processing of information presentation, wherein the interactive processing input means receives an interactive input from the user and issues an event to the event control means, and the event control means receives an input event issued from the interactive processing input means, and a change event of object issued from the object control means, and processes according to the change event.

The nineteenth invention presents, in addition to the twelfth invention, a presentation information creating apparatus further comprising event storage means for storing the event information, and event information adjusting means for adjusting the information stored in the event storage means coinciding with the execution status of the information presentation, wherein the apparatus functions under the control of the event control means.

In the first invention, the object storage means of the information presentation apparatus stores a plurality of objects composed of a set of a data part showing the presentation information about at least one of text, graphics, image, video and sound, and a processing procedure part for specifying the behavior of the data part on the time space, and presentation conditions of presentation information, while the object control means detects that one arbitrary object and other arbitrary object have come to a specific and outputs the change event, the event control means receives the change event the changes the state of at least one of the plural objects.

In the second invention, the object storage means of the information presentation apparatus stores a plurality of objects composed of a set of a data part showing the presentation information about at least one of text, graphics, image, video and sound, and a processing procedure part for specifying the behavior of the data part on the time space, presentation conditions of presentation information, and the conditions about the information presentation concerning the communication status with an external system of the information presentation apparatus, while the object control means detects that one arbitrary object and other arbitrary object have come to a specific relation and produces the change event, event control means receives the change event and changes the state of at least one of the plural objects.

That is, if various events such as instruction from outside, status change of presentation object, change of mutual relation of presentation objects, passing of specific time, and change of communication status occur asynchronously, the presentation control on the objects of presentation are managed parallel and uniformly by the information presentation control means.

In addition, functioning under the control of the event control means by installing external system communication means for starting up the external system or controlling the data take-in from the external system, the use of material data from the external system, and use of application software may be commonly described as a processing procedure of the objects.

In the third invention, the time control means receives time control instructions issued from the object control means to control the time of information presentation, and the event control means receives the change event, and changes the status of at least one of the plural objects.

In the fourth invention, the object storage means of the information presentation apparatus stores a plurality of objects composed of a set of a data part showing the presentation information about at least one of text, graphics, image, video and sound, and a processing procedure part for specifying the behavior of the data part on the time space, and presentation conditions of presentation information, while the object control means detects that one arbitrary object and other arbitrary object and have come to a specific relation and produces the change event, the interpretation execution means interprets the processing procedure part of the pertinent object, and presentation conditions, and requests execution to the object control means or the event control means depending on the processing procedure part and type of the presentation conditions, and the event control means receives the change event and changes the state of at least one of the plural objects.

In the fifth invention, the object storage means of the information presentation apparatus stores a plurality of objects composed of a set of a data part showing the presentation information about at least one of text, graphics, image, video and sound, and a processing procedure part for specifying the behavior of the data part on the time space, and presentation conditions of presentation information, the interactive processing input means receives an interactive input from the user and issues an event to the event control means, while the object control means detects that one arbitrary object and other arbitrary object have come to a specific relation and produces a change event, the event control means receives the change event and changes the state of at least one of the plural objects.

In the sixth invention, the data part storage means of the information presentation apparatus stores the data part and the basic instruction group, and the processing procedure storage means stores the procedure part and the presentation conditions.

In the seventh invention, the data part storage means of the information presentation apparatus classifies and stratifies and then stores the data part and basic instruction group according to the attribute to the data, and since the object control means has a class inheritance means for referring to a higher class if a desired basic instruction is not found in the lower class, the multimedia information may be efficiently stored and controlled, and the presentation software may be easily developed as well.

In the eighth invention, when a time control functional formula of information presentation is given from the object control means, the time control means stores the time control functional formula, and sets the timer interval according to the time control functional formula, thereby requesting the timer generating means to generate a timer. The timer generating means generates a timer according to the request. When requested by the object to change the coefficient of the time control functional formula and the functional format, the time control means executes the change, and when change of the object hierarchical structure is noticed from the object control means, the time control means changes the time control functional formula of the parent object referred to by the time control functional formula. Afterwards, according to the changed time control functional formula, the time control means controls the timer generating means. Accordingly, a relative time control is possible, which is suited to development of presentation software required to be controlled dynamically by time according to certain information.

The ninth invention comprises a space control means possessing a space control functional formula for the space control, same as in the time control, and realizes relative space control, and therefore presentation software with complicated simulation property may be easily developed.

In the tenth invention, when the time control functional formula of information presentation is given from the object control means, the time control means stores the time control functional formula, and sets the timer interval according to the time control functional formula, and requests the timer generating means to generate a timer. The timer generating means generates a timer according to the request. When requested by the object to change the coefficient of the time control functional formula and the functional format, the time control means executes the change, and when change of the object hierarchical structure is noticed from the object control means, the time control means changes the time control functional formula of the parent object referred to by the time control functional formula. Afterwards, according to the changed time control functional formula, the time control means controls the timer generating means. Accordingly, a relative time control is possible. Besides, by using the interactive processing input means for entering parameters necessary for interactive processing of information presentation and the event control means for comprehensively controlling the events, the interactive presentation software may be developed easily, and by totally controlling the events from the user and the events from the objects, it is possible to develop easily a presentation software capable of describing the mutual actions of objects, higher in interactive property and simulation property, and necessary to be controlled dynamically by time according to specific information.

In the eleventh invention, a relative space control is realized by using a space control means possessing a space control functional formula for space control, same as in the time control, and by using an interactive processing input means for entering parameters necessary for interactive processing of information presentation and an event control means for comprehensively controlling the events, an interactive presentation software may be developed easily, and by totally controlling the events from the user and the events from the objects, it is possible to develop easily the presentation software capable of describing mutual actions of objects, higher in interactive property and simulation property.

In the twelfth invention, the object control means of the presentation information creating apparatus stores a plurality of objects composed of a set of a data part showing the presentation information about at least one of text, graphics, image, video and sound, and a processing procedure part for specifying the behavior of the data part on the time space, and presentation conditions of presentation information, while the object control means detects that one arbitrary object and other arbitrary object have come to a specific relation and produces a change event, the event control means receives the change event and changes the state of at least one of the plural objects.

In the thirteenth invention, the object storage means of the presentation information creating apparatus stores a plurality of objects composed of a set of a data part showing the presentation information about at least one of text, graphics, image, video and sound, and a processing procedure part for specifying the behavior of the data part on the time space, presentation conditions of presentation information, and the conditions about the information presentation concerning the communication status with an external system of the information presentation apparatus, while the object control means detects that one arbitrary object and other arbitrary object have come to a specific relation and produces a change event, the event control means receives the change event and changes the state of at least one of the plural objects.

In the fourteenth invention, the object storage means of the presentation information creating apparatus stores a plurality of objects composed of a set of a data part showing the presentation information about at least one of text, graphics, image, video and sound, and a processing procedure part for specifying the behavior of the data part on the time space, and presentation conditions of presentation information, the time control means receives the time control instruction issued from the object control means and controls the time of information presentation, the object control means detects that one arbitrary object and other arbitrary object have come to a specific relation and produces a change event, the event control means receives the change event and changes the state of at least one of the plural objects.

In the fifteenth invention, the time information storage means of the information presentation apparatus receives the time control instructions issued from the event control means and object control means and stores the time control information of information presentation, the time information adjusting means refers to the information stored in the time information storage means coinciding with the execution state of the information presentation and adjust the information stored in the time information storage means, the time control means refers to the information stored in the time information storage means to control the entire time of the information presentation, and therefore precise animation execution considering the real time processing is realized.

In the sixteenth invention, the object storage means of the information presentation apparatus stores a plurality of objects composed of a set of a data part showing the presentation information about at least one of text, graphics, image, video and sound, and a processing procedure part for specifying the behavior of the data part on the time space, and presentation conditions of presentation information, while the object control means detects that one arbitrary object and other arbitrary object have come to a specific relation, and produces a change event, the interpretation execution means interprets the processing procedure part of the pertinent object, and presentation conditions, and requests execution to the object control means or the event control means depending on the processing procedure part and type of the presentation conditions, and the event control means receives the change event and changes the state of at least one of the plural objects.

In the seventeenth invention, the intermediate language converting means of the information presentation apparatus converts the processing procedure part and presentation conditions described in a simplified language into an intermediate language, the intermediate language storage means stores the converted intermediate language information and executes sequentially the stored intermediate language information, and therefore the execution processing of the procedure part may be increased in speed, and the time sharing processing in parallel processing is realized in the unit of the intermediate language corresponding to the machine language, not in the unit of the simplified language created by the user, which contributes to real time processing.

In the eighteenth invention, the object storage means of the information presentation apparatus stores a plurality of objects composed of a set of a data part showing the presentation information about at least one of text, graphics, image, video and sound, and a processing procedure part for specifying the behavior of the data part on the time space, and presentation conditions of presentation information, the interactive processing input means receives an interactive input from the user and issues an event to the event control means, while the object control means detects that one arbitrary object and other arbitrary object have come to a specific relation and produces a change event, the event control means receives the change event and changes the state of at least one of the plural objects.

In the nineteenth invention, the event information storage means stores the event information such as input event issued from the interactive processing input means, timer interrupt event issued from the time control means, and object action status change event issued from the object control means, the event information adjusting means adjusts the information stored in the event storage means coinciding with the execution status of the information presentation, and the event control means refers to the information stored in the event information storage means and controls the entire events of the information presentation, so that animation considering the real time processing may be realized.

BRIEF DESCRIPTION OF THE DRAWINGS

FIG. 12 is a diagram showing the script for defining the operation in the fifth embodiment, FIG. 13 is a diagram showing the script for defining the operation in the fifth embodiment, FIG. 14 is a diagram showing the script for defining the operation in the fifth embodiment, FIG. 15 is a diagram showing the script for defining the operation in the fifth embodiment, FIG. 16 is a diagram showing the script for defining the operation in the fifth embodiment, FIG. 17 is a diagram showing the script for defining the operation in the fifth embodiment, FIG. 18 is a diagram showing the script for defining the operation in the fifth embodiment, FIG. 20 is a diagram showing the script for defining the operation in the first embodiment, FIG. 21 is a diagram showing the script for defining the operation in the first embodiment, FIG. 22 is a diagram showing the script for defining the operation in the first embodiment, FIG. 26 is a diagram showing the script for defining the operation of the sixth embodiment.

DESCRIPTION OF THE PREFERRED EMBODIMENTS (First Embodiment)

Figure 1:
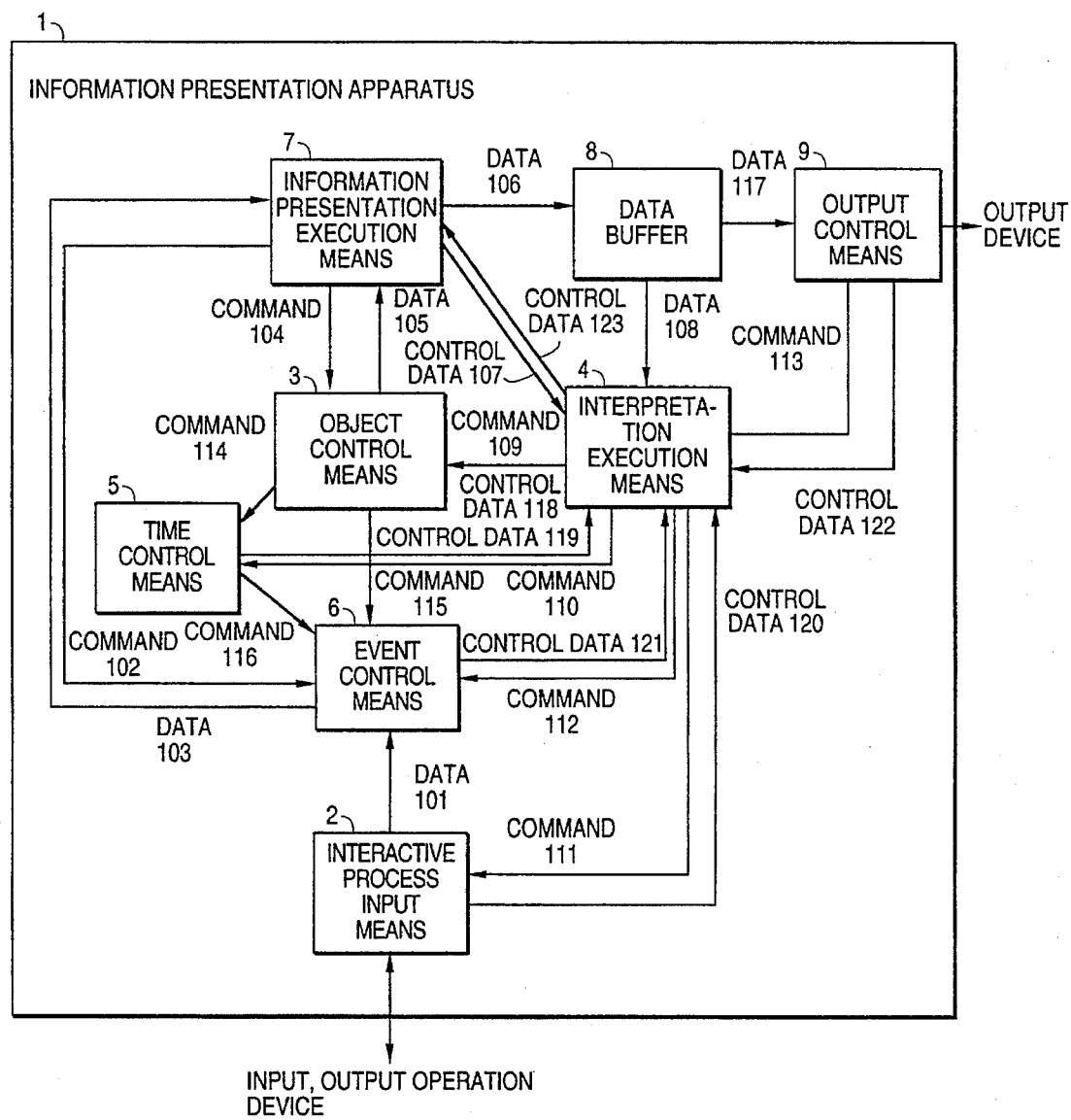
FIG. 1 is a block diagram showing the constitution of an information presentation apparatus in a first embodiment of the invention.

As a first embodiment, an information presentation apparatus for presenting information using the multimedia information as the source is explained below by reference to FIG. 1. FIG. 1 is a block diagram showing the constitution of the information presentation apparatus.

In FIG. 1, numeral 1 denotes an information presentation apparatus, and 2 represents an interactive processing input means for entering parameters necessary for interactive processing of presentation of multimedia information. Various input and output operation devices such as mouse, switch and keyboard are connected to this interactive processing input means 2.

Numeral 3 denotes an object control means for preliminarily storing objects or the like composed of a set of a data part of multimedia information such as text, graphics, image, video and sound and processing procedure for processing it, and responsible for class inheritance control of the object, space configuration control, and operation status control, depending on the command conforming to the processing procedure from an interpretation execution means 4 or an information presentation execution means 7 described later. That is, for example, to display an image, the object is controlled by the object control means 3 so that the object provided with specific attribute in hierarchical structure may be displayed at specified position, in specific status.

Here, each object such as text, graphics, image, video and sound which are stored in the object control means 3 are so designed, in that respective attribute and operation method to itself such as move or deformation, formed in an object-oriented method included in itself, are used and so that, with this, each object may be easily handled independently in the object control means 3 and others. That is, the operation of each object may be independently defined, and it is easy to define the conditions about the manipulation on the interactive processing input means 2, as well as the mutual actions between objects such as collision of objects, and hence the presentation software in which the objects are complicated may be easily developed.

The objects can be defined hierarchically, and therefore the combinations of a set of plural objects and the mutual relations of these objects can be also described as objects.

Numeral 4 is an interpretation execution means for interpreting the processing procedure described in the simplified interpreter type language of objects, and producing a command depending on the processing procedure of the object control means 3 or the like. It is, meanwhile, not necessary to compose so as to interpret the interpreter type language as mentioned above, but by thus composing, the presentation content can be changed without having to recompile in the development process of the presentation software, so that the number of processes for development may be greatly decreased.

Numeral 5 is a time control means for receiving the time control command issued from the interpretation execution means 4 or the object control means 3, and controlling the time of the information presentation. Numeral 6 is an event control means for comprehensively managing the operation control of the time space of the interactive processing and object, by controlling the timer interrupt event issued from the time control means 5, and the object operation status change event issued from the object control means 3. That is, if an input event and a timer interrupt event occur asynchronously, the event control means 6 controls these events comprehensively, and by unitarily controlling execution of processing depending on the event or delay of execution, the information presentation resembling a hypertext considering time control may be realized.

Numeral 7 is an information presentation execution means for overall control of the information presentation. This is, this information presentation execution means 7 transfers control to the interpretation execution means 4 or event control means 6, and starts them up, and the description within the object and processing corresponding to the event are effected, and the information is presented. Numeral 8 is a data buffer for temporarily storing the data part and processing procedure part of the object, being read out and produced by the information presentation execution means 7 from the object control means 3. Numeral 9 is an output control means for controlling the output to the audio equipment or video output appliance for multimedia information presentation. Various output devices such as audio output device and display are connected to the output control means 9. Numerals 101 through 123 denote paths of control data, commands, data and others. The names stated above refer only to typical content to be transmitted for the sake of convenience, and actually various contents are transmitted depending on the circumstances, regardless of these names.

In this constitution, information presentation of, for example, interactive animation is effected as follows.

In the first place, the information presentation execution means 7 sends control data 107 to the interpretation execution means 4 in order to obtain the object name desired for information presentation from the user, and the interpretation execution means 4 receives it and sends command 111 to the interactive processing input means 2.

When the object name is entered, the interactive processing input means 2 sends a notice of completion of input and the object name to the event control means 6 as data 101. The event control means 6 registers the received data 101.

The information presentation execution means 7 sends command 102 for requesting event to the event control means 6, and receives the data 103 of object name as the event information from the event control means 6, and sends command 104 for taking out the object to the object control means 3. Furthermore, the information presentation execution means 7 takes out an object relating to the event information from the object control means 3 as the data 105, and transfers the data 106 of the data part and processing procedure of the object to the data buffer 8, and transfers the control to the interpretation execution means 4 by the control data 107.

Receiving it, the interpretation execution means 4 refers the data buffer 8 by the data 108, and interprets the processing procedure of the object, and requests execution to the object control means 3 with command 109, to the time control means 5 with command 110, to the interactive processing input means 2 with command 111, to the event control means 6 with command 112, or to the output control means 9 with command 113, depending on the type of the processing procedure.

The requested object control means 3 sends command 115 notifying operation status change of the object during command execution depending on the type of the command to the event control means 6, or sends command 114 for generation of new timer to the time control means 5, and returns the control to the interpretation execution means 4 with control data 118.

The requested time control means 5 executes the processing depending on the type of the command, notifies end of execution to the interpretation execution means 4 with control data 119, controls the timer interruption, and sends command 116 to the event control means 6 when a timer interruption occurs. The requested interactive processing input means 2 sends data 101 to the event control means 6 after command execution, and transfers the control to the interpretation execution means 4 with control data 120. The event control means 6 transfers the control to the interpretation execution means 4 with control data 121 after command execution, and the output control means 9 does, with control data 122 after command execution.

The interpretation execution means 4 given the control repeats interpretation of the processing procedure and execution request until the processing procedure terminates, and transfers the control to the information presentation execution means 7 with control data 123, and the information presentation execution means 7 given the control sends again the event request command 102 to the event control means 6, and repeats the series of processing to progress information presentation.

Incidentally, in order to accept such asynchronous interruption, the event control means 6 and time control means 5 are designed to be executed in different processes.

Figure 5:
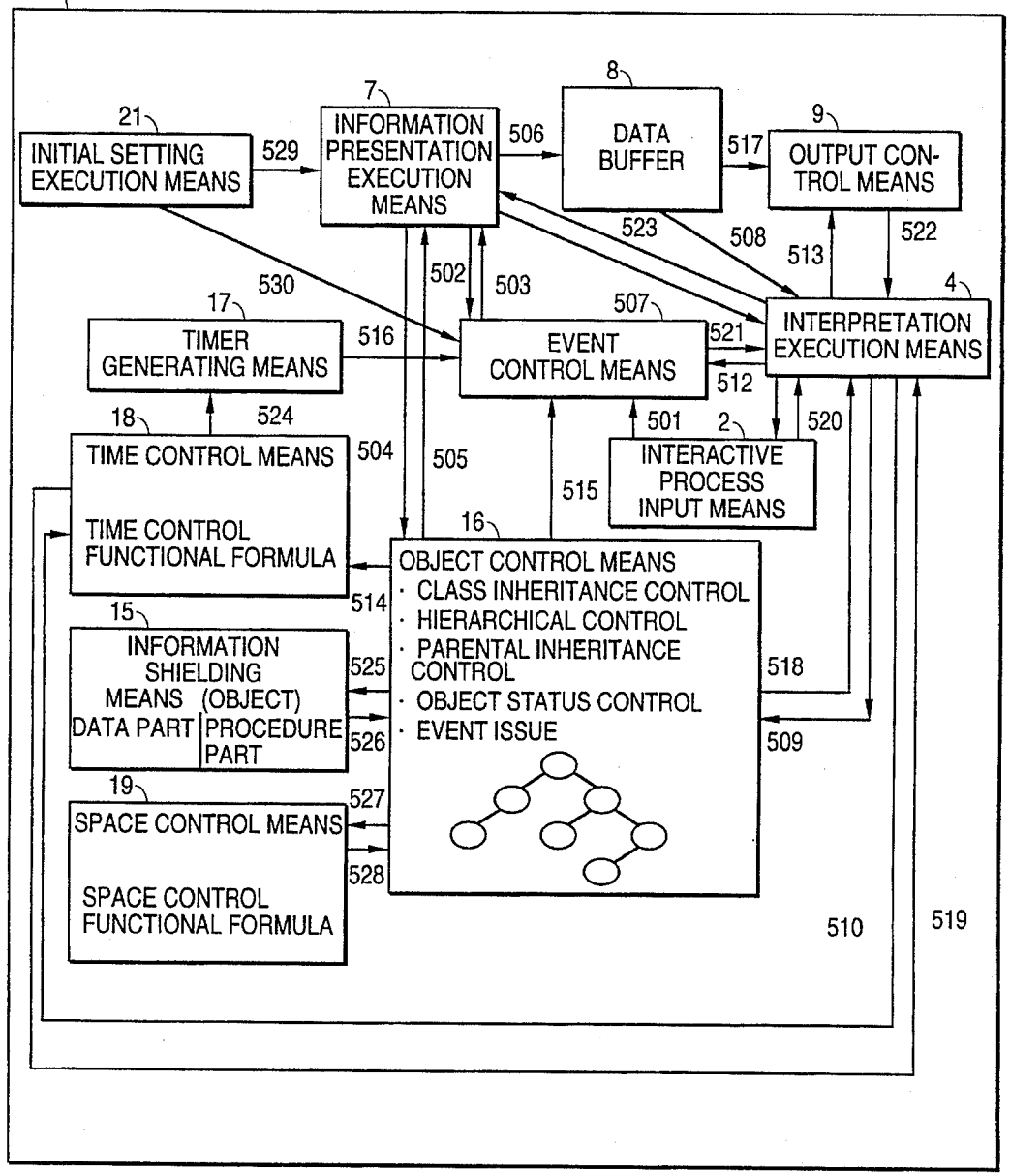
FIG. 5 is a block diagram showing the constitution of an information presentation apparatus in a fifth embodiment.

As a more specific example of operation for information presentation, the operation of the animation display as shown in FIG. 5 is described below.

The information presentation execution means 7 sends control data 107 showing the command to the interpretation execution means 4 in order to obtain the object name for information presentation from the user. For example, if the command content is an input request command, "input object-name", in the object name for information presentation, the interpretation execution means 4 receives it and sends command 111 to the interactive processing input means 2. When the object name is entered, the interactive processing input means 2 notifies completion of input, and sends the object name to the event control means 6 as data 101.

The event control means 6 registers the received data 101, and the information presentation execution means 7 sends command 102 for event request to the event control means 6, receives data 103 in the object name as an event information from the event control means 6, sends command 104 for taking out the object to the object control means 3, takes out the object relating to the event information from the object control means 3 as data 105, and transfers the data 106 of data part and processing procedure of the object to the data buffer 8.

For example, assuming that the processing procedures as shown in FIGS. 20, 21, 22 are transferred to the data buffer 8, the information presentation execution means 7 transfers control to the interpretation execution means 4 with control data 107.

In the first place, the interpretation execution means 4 refers the data buffer 8 by the data 108, and interprets the processing procedure of the object, detecting that it is composed of four blocks, that is, "mainframe" block of (51) to (59), "On mainframe End" block of (60), "On Mouse Down" block of (61), and "On Collision meteor and earth" of (62) to (67), and sends command 112 to the event control means 6 to register four events, "mainframe" event, "On mainframe End" event, "On Mouse Down" event, and "On Collision" event.

Receiving this command, the event control means 6 registers the four events in the event table as event information. Among these four events, in order to execute from the processing procedure (51) to (59) corresponding to the "mainframe" event set to perform the processing setting, and the control is transferred to the interpretation execution means 4 with control data 121. The interpretation execution means 4 given the control successively interprets and executes the corresponding processing procedures.

The interpretation execution means 4 interprets to create an object, ball by (51), and to create a ball named "Sun," a create command 109 is sent to the object control means 3. Receiving it, the object control means 3 creates the object, and transfers the control to the interpretation execution means 4 with control data 118.

The interpretation execution means 4, same as in the processing procedure of (51), repeats interpretation and execution request of (52), (53), and creates the objects of "earth" and "meteor." With (54) to (56), the interpretation execution means 4 sends the command 109 for setting respective object position to the object control means 3, and with (57) to (59), the interpretation execution means 4 sends command 109 for specifying respective object colors to the object control means 3. Also by sending command 113 to the output control means 9, these objects are displayed.

Here, the processing procedure of "mainframe" is all over, and the interpretation execution means 4 notifies end of processing procedure of the "mainframe" event to the event control means 6 with control command 112, and transfers the control to the event control means 6. The event control means 6 erases the "mainframe" event from the already registered event information, and registers that the "mainframe End" event is true, and transfers the control to the information presentation execution means 7 with data 103 showing control. The information presentation execution means 7 issues command 102 to the event control means 6 in order to obtain an effective event for the next time, and transfers the control to the event control means 6. At the present, the effective event is "mainframe End," and the event control means 6 transfers the control to the interpretation execution means 6 with control data 121 in order to execute the processing procedure (60) corresponding to the event. The interpretation execution means 4 given the control requests the time control means 5 to send a command 116 for issuing a timer interrupt event at every specific period Δt by command 110, and registers "move" event in the event control means 6 with command 112. When the timer interrupt event is issued from the time control means 5 by the command 116, the event control means 6 registers the event in the event table. The event control means 6 controls the execution status and execution order of the registered events. Since the presently effective event is (60) only, and the event control means 6 gives it the execution right, and requests the interpretation execution means 4 to execute this event. The interpretation execution means 4 calculates the position of the object earth so as to turn around the range of Sun in radius 100, and sends command 113 requesting screen output to the output control means 9.

The output control means 9 produces the object earth on the screen according to the command 113. Afterwards, the event control means 6 gives the event of (60) the execution right at every timer interruption, and the above processing is done, and it is repeated, thereby displaying the animation of the earth revolving about Sun.

Supposing that an operation for clicking the mouse button on the object meteor is performed, the interactive processing input means 2 sends the necessary parameters (in this case, object name meteor, and event type Mouse Down) and the input end notice to the event control means 6 as data 101. The event control means 6, receiving it, registers this event, and transfers the control to the information presentation execution means 7 with data 103 showing control, only after execution of unit processing if (60) is presently in the midst of processing in every Δt period. The information presentation execution means 7 given the control issues command 102 to the event control means 6 in order to obtain an effective event for next time, and transfers the control to the event control means 6.

The effective event at the present is "Mouse Down," and the event control means 6 transfers the control to the interpretation execution means with control data 121 in order to execute the processing procedure (61) corresponding to this event. The interpretation execution means 4 given the control interprets (61), and requests the time control means 5 with command 110 to issue an event at every specific interval Δt. Similar to the execution of the above (60), the meteor moves according to g(t).

When the meteor and earth collide, the object control means 3 notifies the event "collision" to the event control means 6 with command 115. Receiving it, the event control means 6 registers this event, and transfers the control to the information presentation execution means 7 with the data 103 showing control, only after execution of unit processing if (60) and (61) are presently in the midst of processing done in every Δt period. The information presentation execution means 7 given the control issues a command 102 in order to obtain an effective event for next time, and transfers the control to the event control means 6.

At the present, the effective event is "Collision meteor and earth," and the event control means 6 transfers the control to the interpretation execution means 4 with control data 121 in order to execute the processing procedures (62) to (67) corresponding to the event. The interpretation execution means 4 given the control substitutes the position of the object meteor for the variable "position" at (62), and sends the notice of end of execution of one line to the event control means 6. The event control means 6 requests the execution of event collision again to the interpretation execution means 4, after completion of execution of (60) and (61).

This processing occurs in every line from (63) to (67) thereafter, but the processing is similar and explanation is omitted.

The interpretation execution means 4 sends command 109 to the object control means 3 in order to eliminate the objects meteor and earth at (63) and (64), and the object control means 3, receiving it, erases the specified objects, and returns the control to the interpretation execution means 4 with control data 118, and creates ten ball objects at (65) in the similar processing. Sending command 113 to the output control means 9, these objects are erased or displayed.

The procedure at this time is same as in (51) to (53), and explanation is omitted. In this case, however, in order to create multiple objects, the same processing as in (51) to (53) is done every time one object is created. Next, at (66), the asteroid ?? created at (65) is put in the place of variable "position." At (67), around "position," ten asteroids ?? are moved radially. The processing of this move is also same as in (60), (61).

This ends the processing of the event "collision," and the interpretation execution means 4 tells the end of processing procedure of the "Collision" event to the event control means 6 with control command 112, and transfers the control to the event control means 6. The event control means 6 deletes "Collision" event from the event table, among the already registered event information.

Meanwhile, as for the processing of event collision issuing, the possible events that may be executed at the time of creation of each object are to be read first. In this case, first reading out the data from (61) to (67), the executable events Mouse Down, Created, Collision are registered in the reserve event table, and as for Collision, the information presentation execution means 7 prepares for Collision event issuing. This is to notice to the meteor and earth to check the positions mutually when changing the position. Hence, unnecessary event processings may be eliminated.

In this example, for the sake of simple explanation, an animation is displayed, but the information may be presented by the similar processing if the video image or recorded sound is combined with animation.

Thus, according to the embodiment, by unifying the time control and interactive processing as an event, the hypertext property and the video editing character are both provided, and as compared with the conventional presentation software in which the scenario was composed of electronic film model, the presentation software of much higher quality may be developed or presented easily.

Especially in the field of educational software and amusement software, it is effective for presentation of a presentation software of high simulation type high in audiovisual effect with interactive property, by comprehensively describing the operation of each multimedia data in time space combining time and space.

Besides, owing to use of the object-oriented technique, the mutual relations of the objects may be easily defined, and it is particularly useful in the field where information presentation of high simulation property is required, such as educational support fields of mathematics or dynamics.

Furthermore, by using the object-oriented technique, new media and classes may be easily added, and it is possible to cope flexibly and quickly with the progress of technology and development of application.

(Second Embodiment)

As a second embodiment of the invention, in addition to the constitution of the first embodiment, the information presentation apparatus composed so as to communicate with other devices is explained below by reference to FIG. 2.

In the second embodiment, the constituent elements having the same functions as the first embodiment are identified with corresponding reference numbers and their explanations are omitted.

Figure 2:
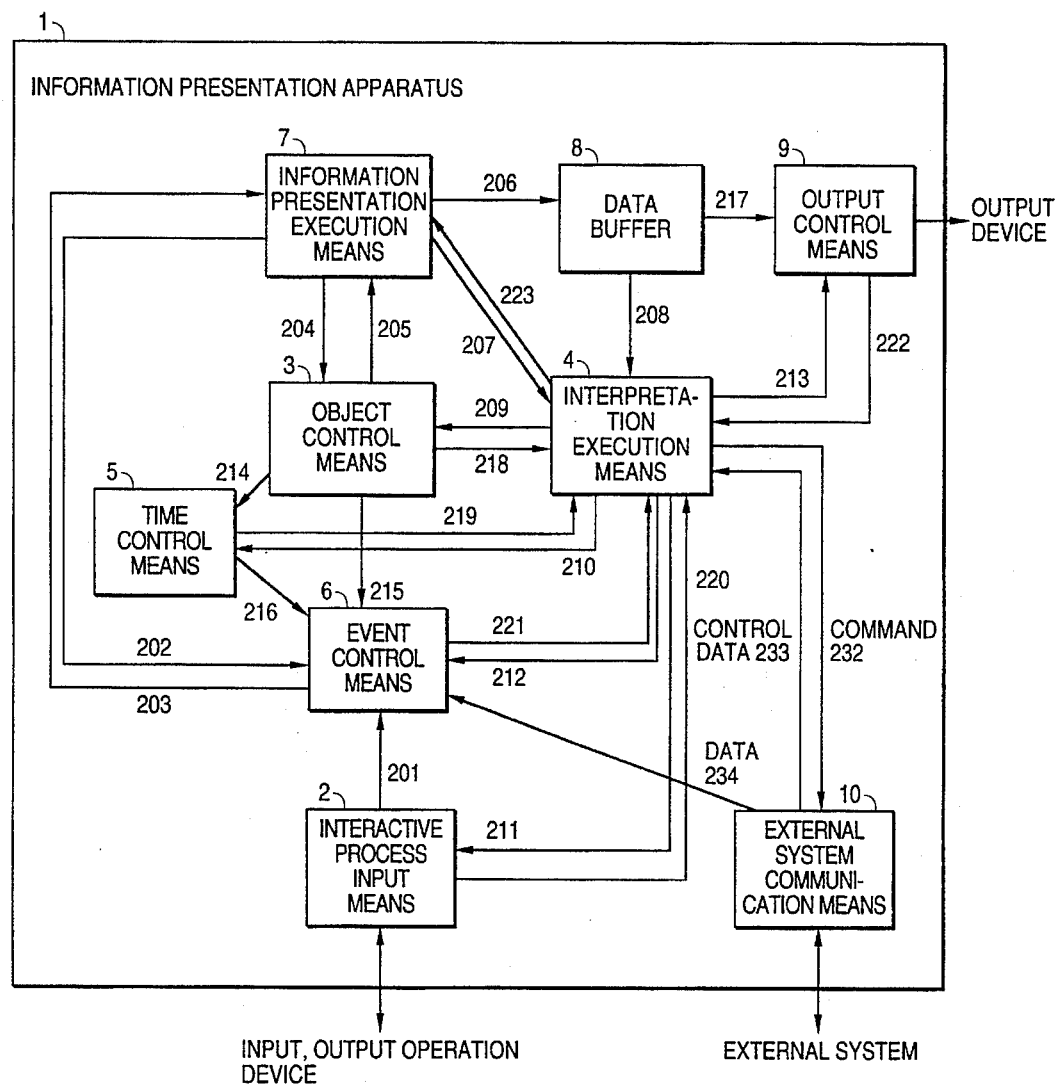
FIG. 2 is a block diagram showing the constitution of an information presentation apparatus in a second embodiment.

In FIG. 2, numeral 10 denotes an external system communication means for starting up an external system such as other information presentation apparatus, application software or the like, and controlling data take-in from the external system. This external system communication means 10 is designed to be executed separately from the event control means 6 and time control means 5, in order to accept an asynchronous interruption from the external system.

Numerals 201 to 223, 232 to 234 represent paths of control data, commands, data, and others. These name, however, relate to main contents to be transmitted for the sake of convenience, and actually various data are transmitted depending on the situation regardless of the names.

In this constitution, when presenting information, the interpretation execution means 4 refers the data buffer 8 by data 208, and interprets the processing procedure of the object, and requests execution to the object control means 3, time control means 5, interactive processing input means 2, event control means 6, or output control means 9 with commands 209 to 213 depending on the type of the processing procedure, and also requests the execution to the external system communication means 10 with command 232.

The external system communication means 10, when receiving the execution request, sends data 234 to the event control means 6 after execution of the command, and transfers the control to the interpretation execution means 4 with control data 233, and monitors the event from the external system.

When the external system communication means 10 receives data from the external system, it sends data 234 to the event control means 6.

The event control means 6 processes the event by receiving data 234 showing the command and data from the external system communication means 10, same as when receiving commands 115, 116 from the object control means 3 and time control means 5.

Thus, by functioning the external system communication means 10 under the control of the event control means 6, the external system is started up, the data take-in from the external system is controlled, and the use of material data from the external system and use of application software may be done uniformly as the processing procedure of object. Furthermore, corresponding to the operation of the external system, the object stored in the object control means 3 can also be presented.

(Third Embodiment)

As a third embodiment of the invention, the presentation information creating apparatus for creating presentation information using multimedia information as the source is explained below by reference to FIG. 3.

This presentation information creating apparatus not only creates a presentation information fixed in the mutual relation of the multimedia information same as in the conventional apparatus, but also describes the conditions and so forth about the mutual relations as processing procedures of objects, so that the information to be presented as shown in the first and second embodiments may be created.

In the third embodiment, too, the constituent elements having the same functions as in the first embodiment are identified with the corresponding reference numbers and explanations are omitted.

Figure 3:
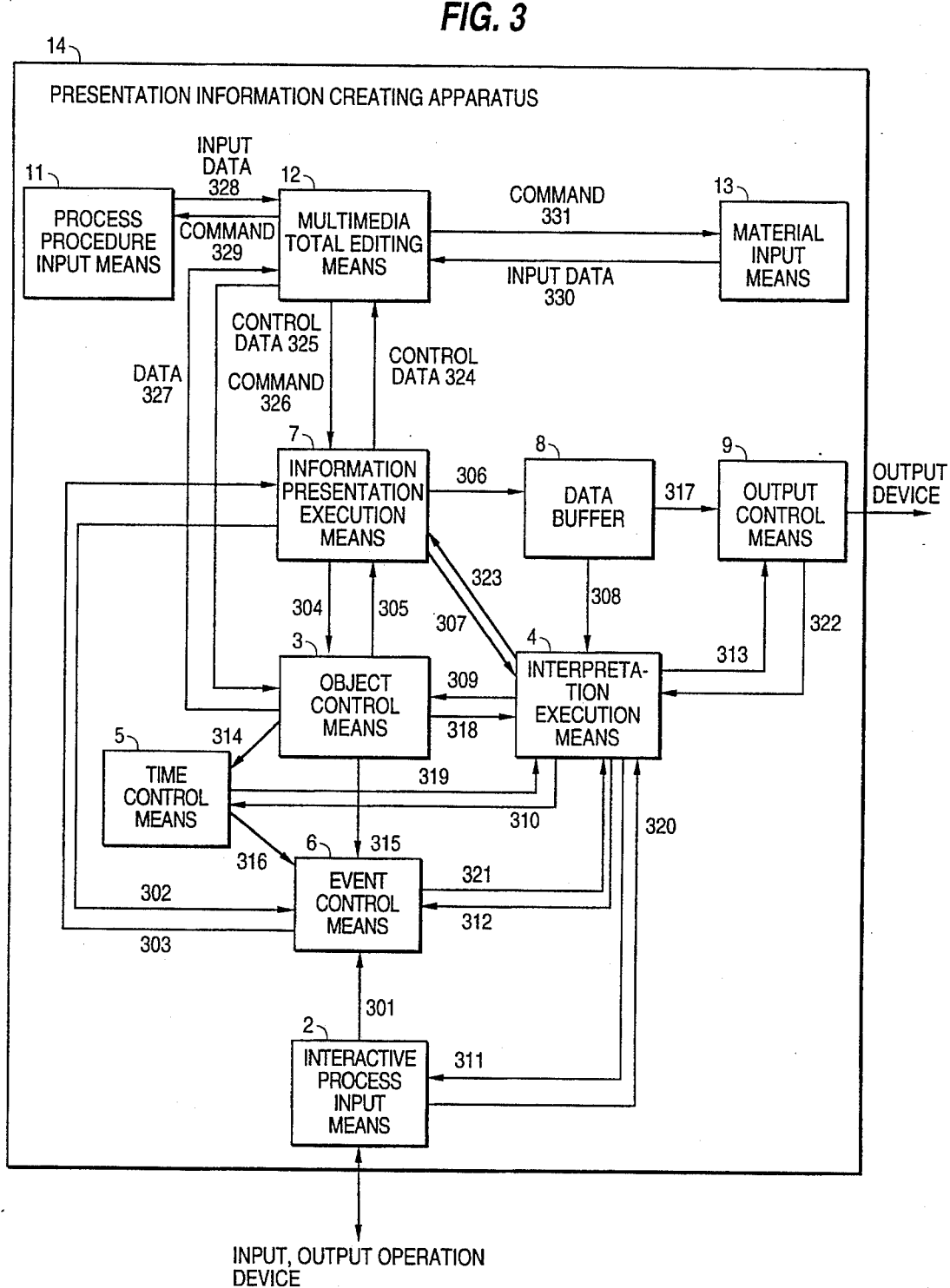
FIG. 3 is a block diagram showing the constitution of a presentation information creating apparatus in a third embodiment.

In FIG. 3, numeral 14 is a presentation information creating apparatus.

Numeral 11 is a processing procedure input means for entering the processing procedure or editing instruction of object information. More specifically, for example, a text editor is used. Graphic data may be also entered by using the graphic data or the like.

Numeral 12 denotes a multimedia total editing means for creating object by editing multimedia materials entered from the input means 11 or material input means 13 depending on the editing instruction from the input means 11.

Numeral 13 is a material input means for entering plural multimedia materials such as text, graphics, image and sound. As the material input means 13, for example, various source information output appliances such as VTR, video camera, audio tape recorder, and so on.

Numerals 301 to 331 represent paths of control data, commands, data, and others. These name, however, relate to main contents to be transmitted for the sake of convenience, and actually various data are transmitted depending on the situation regardless of the names.

In this constitution, the presentation information is created, for example, as shown below.

First, the multimedia total editing means 12 receives the material input data 330 from the material input means 13 by command 331, and receives the input data 328 of processing procedure from the processing procedure input means 11 by command 329.

The created object is stored in the object control means 3 by command 326. The stored object may be referred to or edited again by the command 326 and data 327.

Thus, after the object is stored in the object control means 3, the operation of the created object is checked by transferring the control to the information presentation execution means 7 with control data 325.

That is, the information presentation execution means 7 sends control data 307 to the interpretation execution means 4 in order to obtain object name for information presentation from the user, and the interpretation execution means 4, receiving it, sends command 311 to the interactive processing input means 2, and thereafter, in the same operation as in the first embodiment, the information is presented according to the stored object.

When all events are over, however, the information presentation execution means 7 transfers the control to the multimedia total editing means 12 by control data 324, thereby setting in the state ready for editing again.

In this way, the object can be created and the processing procedure can be described by using the object-oriented technique or interpreter type language, and moreover creation of presentation information and presentation processing for confirmation may be easily repeated, and therefore enhancement of development efficiency in the development of presentation software and improvement of software quality may be easily achieved.

In particular, by independently disposing the interpretation execution means 4, it is easy to advance the simplified interpreter highly, and it is easy for non-specialists of computers such as educators and sales people to develop presentation software, thereby making it possible to widely realize presentation beyond the paper media for the general people.

(Fourth Embodiment)

As a fourth embodiment of the invention, in addition to the constitution of the third embodiment, the presentation information creating apparatus composed so as to be communicative with other devices is explained by reference to FIG. 4.

In the fourth embodiment, too, the constituent elements having the same functions as the first to third embodiments are identified with corresponding reference numbers, and their explanations are omitted.

Figure 4:
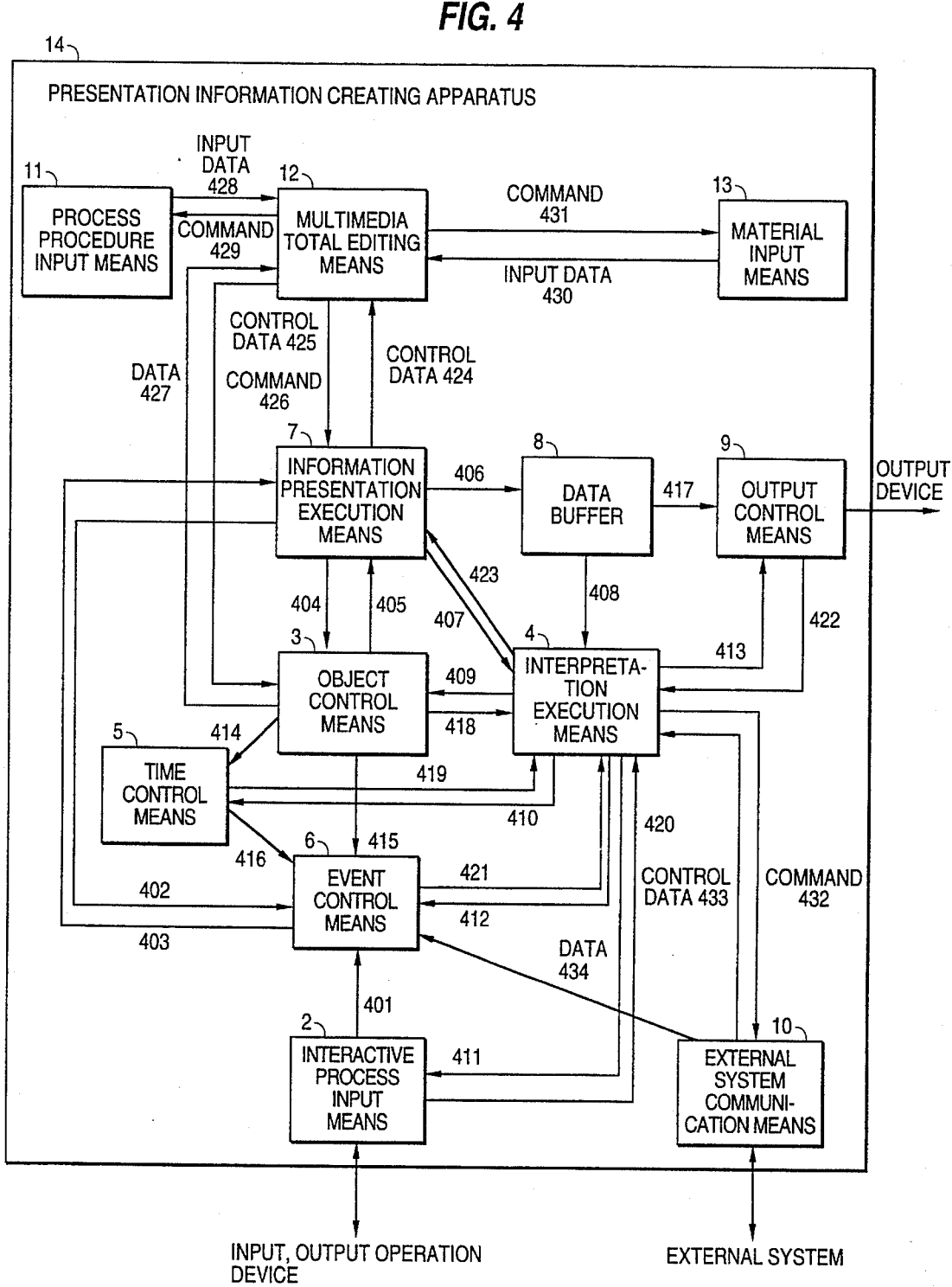
FIG. 4 is a block diagram showing the constitution of a presentation information creating apparatus in a fourth embodiment.

In FIG. 4, the input means 11, multimedia total editing means 12, and material input means 13 are the same as those in the presentation information creating apparatus in the third embodiment, and the external system communication means 10 is the same as in the information presentation apparatus in the second embodiment.

Numerals 401 to 434 represent paths of control data, commands, data, and others. These name, however, relate to main contents to be transmitted for the sake of convenience, and actually various data are transmitted depending on the situation regardless of the names.

In this constitution, the presentation information can be created in the same way as in the third embodiment. At this time, by creating the object relating to the communication with an external system through an external system communication means 10, the information presentation as shown in the second embodiment may be realized.

(Fifth Embodiment)

A fifth embodiment of an information presentation apparatus of the invention is described below referring to the drawing. In the fifth embodiment, too, the constituent elements having the same functions as in the first to fourth embodiments are identified with the same reference numbers and their explanations are omitted.

In FIG. 5, numeral 20 denotes an information presentation apparatus, 15 is a information shielding means called as object composed of a set of a data part of information and a procedure part for processing it, possessing a hierarchical structure, 16 is an object control means possessing the function for class inheritance control of objects, the function for parental inheritance control of objects, the function for hierarchical structure control of objects, and the function for controlling the operation status of objects and issuing an event, 17 is a timer generating means for interrupting in every specific period, 18 is a time control means possessing time control functional formula for describing the time changes of the objects, 19 is a space configuration control means possessing a space configuration control functional formula for describing space changes of the objects, and 21 is an initial setting execution means for creating application windows or the like for information presentation.

Numeral 2 is interactive processing input means for entering parameters necessary for interactive processing, 4 is an interpretation execution means for interpreting and executing the processing procedure described in the object, 6 is an event control means for controlling the status and execution order of the events transmitted from the timer generating means 17, object control means 16, and interactive processing input means 2, and 7 is an information presentation execution means for controlling the entire information presentation. That is, the information presentation execution means 7 transfers the control to the interpretation execution means 4 and event control means 6, and starts them up, and the description within the object and the processing depending on the event are effected, and the information is presented.

Figure 9:
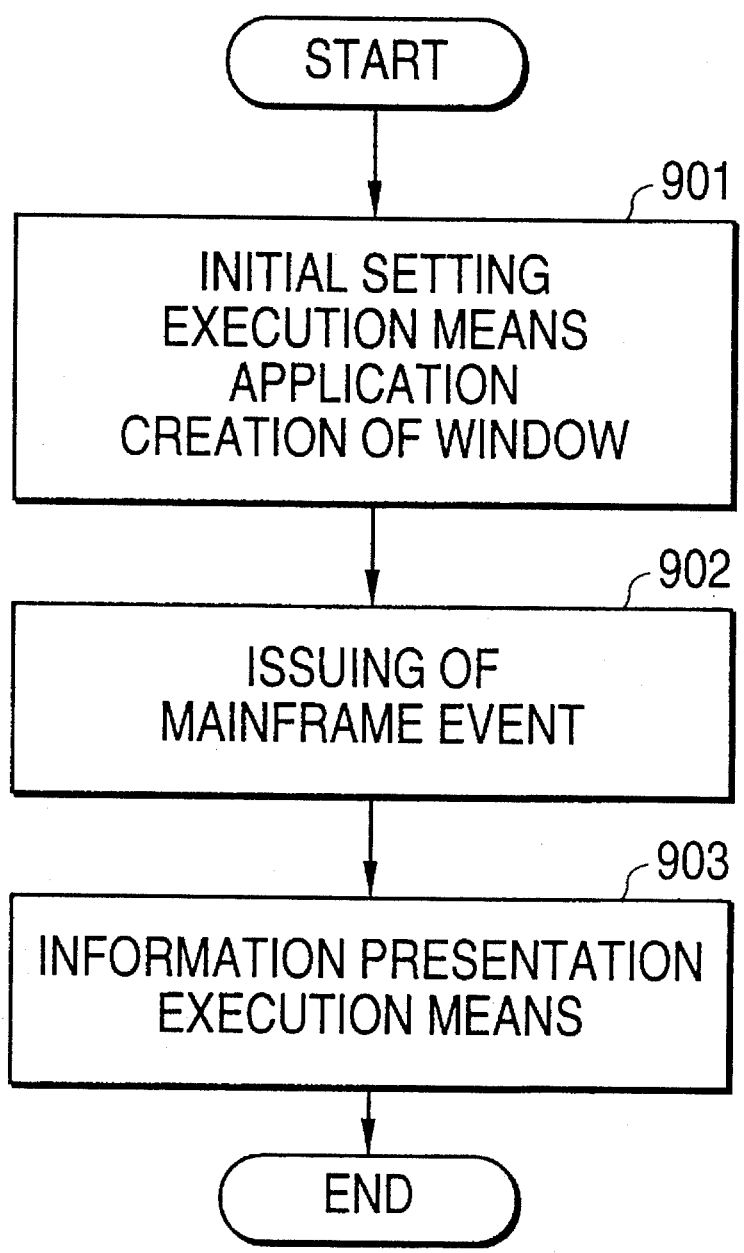
FIG. 9 is a flow chart explaining the operation of the whole apparatus in the fifth embodiment.
Figure 10:
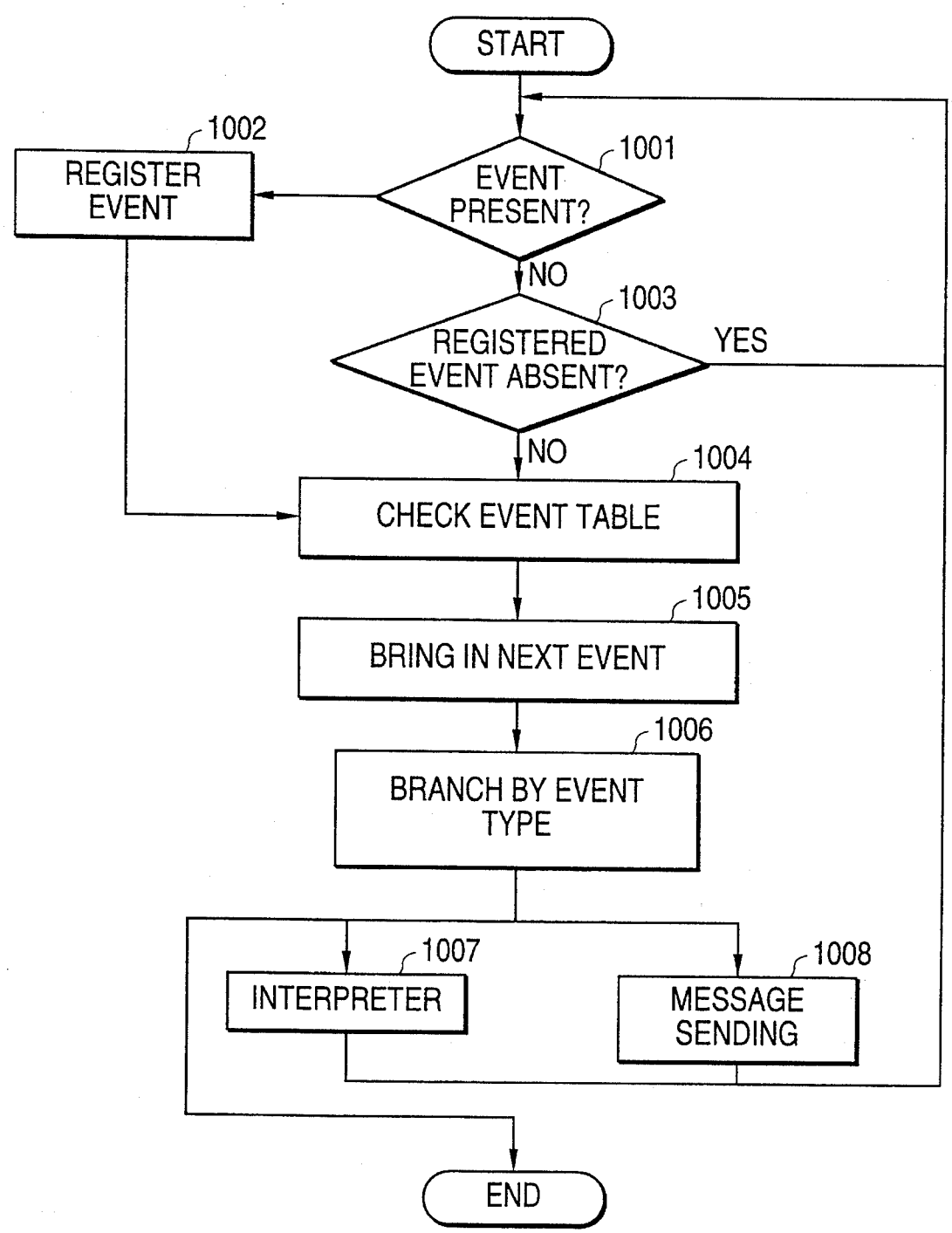
FIG. 10 is a flow chart explaining the operation of the information presentation execution means in the fifth embodiment.
Figure 11:
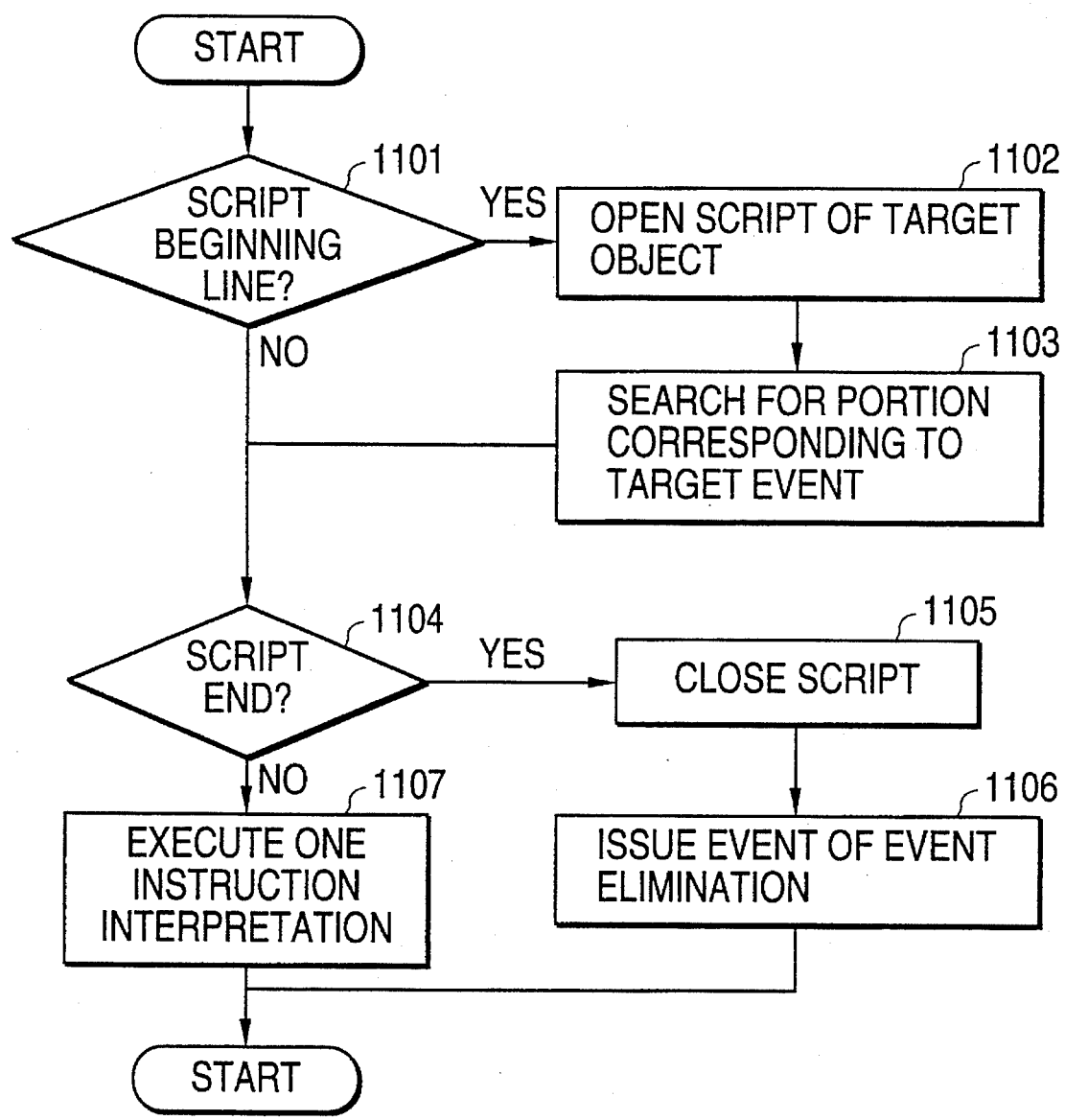
FIG. 11 is a flow chart explaining the operation of the interpretation execution means in the fifth embodiment.
Figure 19:
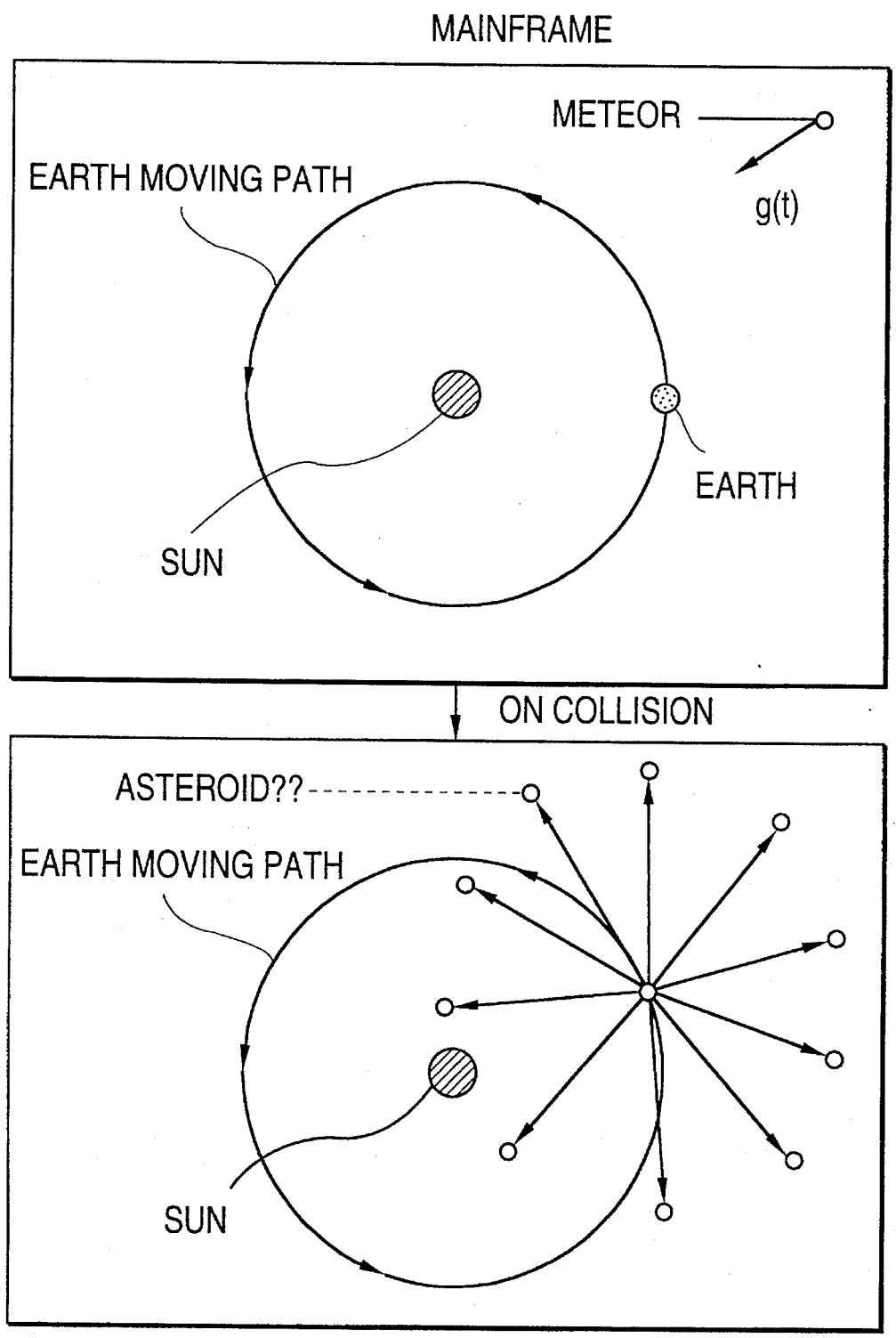
FIG. 19 is an explanatory diagram showing an example of presented animation.
Figure 23:
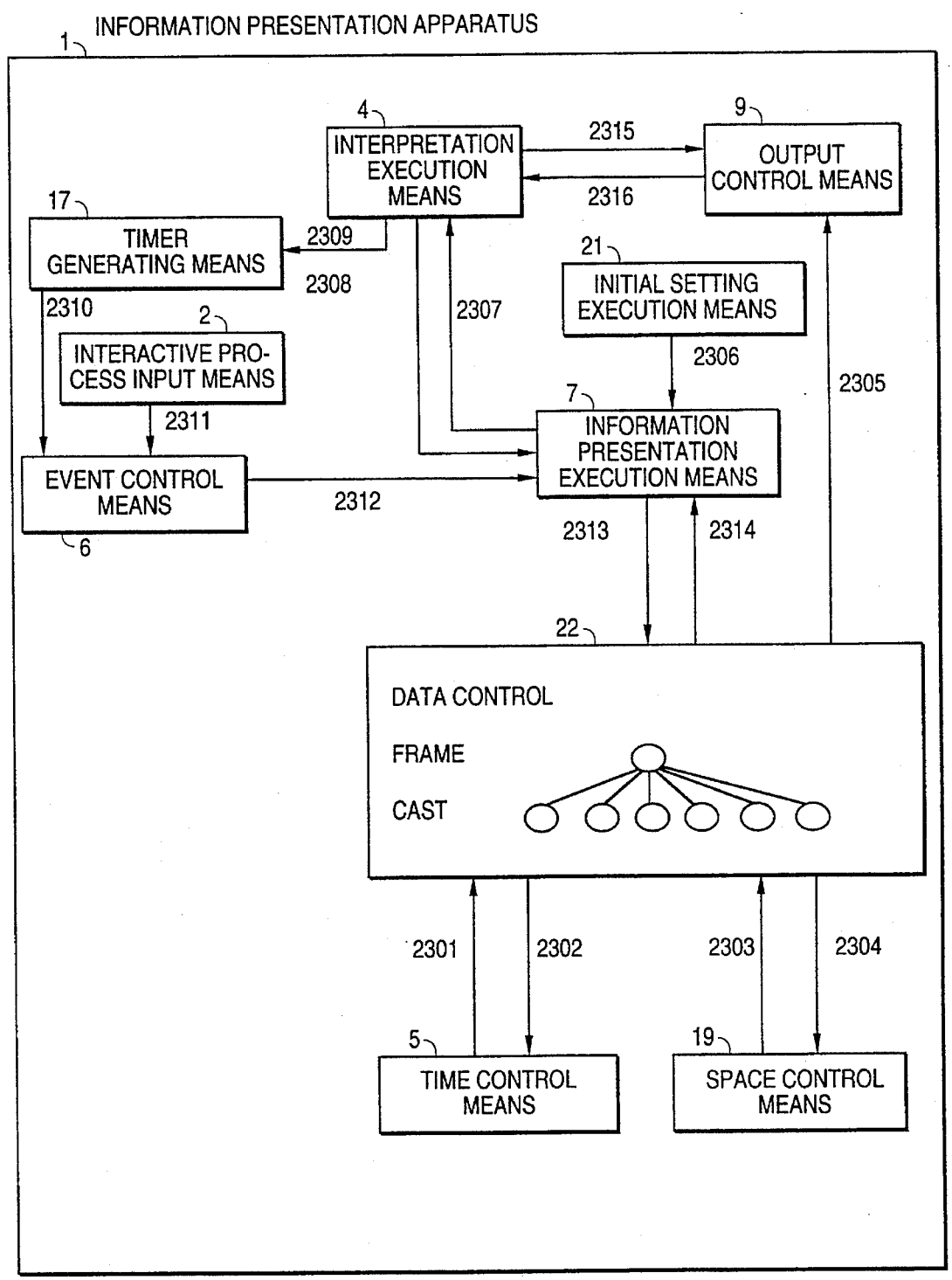
FIG. 23 is a block diagram of a conventional information presentation apparatus.

Numeral 8 is a data buffer for temporarily storing the data part and processing procedure part of the object being read out and produced from the object control means 3 by the information presentation execution means 7. Numeral 9 is an output control means for output control to the video output device for information presentation, 501 through 530 are signal lines showing control signals, commands, data, and others, and by the following operation, the information of the animation is presented. Flow charts are shown in FIG. 9 to FIG. 11.

First, the initial setting execution means 21 creates an application window (901), issues event 530 for creating an object in an initial state (902), and transfers the control to the information presentation execution means 7 (903). The information presentation execution means 7 sends a check request 502 to the event control means 6 to see if an event has arrived or not (1001), and the event control means 6 registers the event if it has arrived (1002), the information presentation execution means 7 sends control signal 507 to the interpretation execution means 4 (1007), and the interpretation execution means 4 sends to the object control means 16, read-out command 509 of the corresponding portion of the processing procedure of the object to the object. Receiving it, the object control means 16 sends read-out command 525 to the object 15, and the object 15 sends processing procedure data 526 to the object control means 16.

Receiving the processing procedure data 526, the object control means 16 sends it to the interpretation execution means 4, as processing procedure data 518. The interpretation execution means 4 interprets the processing procedure data 518, and sends, depending on the type of the processing procedure, execution command 509 to the object control means 16, command 511 to the interactive processing input means 2, command 510 to the time control means 18, and command 513 to the output control means 9 (1107). The object control means 16 sends the corresponding command 525 to the corresponding object 15. The object 15 sends a notice of end of execution or unfinished execution, together with the data, to the object control means 16. The object control means 16, as required, sends data 518 to the interpretation execution means 4, and sends a notice 515 of end of execution or unfinished execution to the event control means 6. Receiving it, the event control means 6 deletes the pertinent event if a notice of unfinished execution has been transmitted.

The information presentation execution means 7 requests the event control means 6 to select the event to be executed next (1005), and sends control signal 507 or 504 to the interpretation execution means 4 or object control means 16. Repeating the same action, when the processing of the data 518 sent from the object control means 16 to the interpretation execution means 4 is over, the interpretation execution means 4 sends the event deletion command 512 to the event control means 6 (1106). The event control means 6 deletion the event, and selects the next event (1005). If there is no event to be selected, it waits until an event is sent in. Here, if the user input is given to the interactive processing input means 2, the interactive processing means 2 sends it to the event control means 6 as event 501.

When execution of command requiring time control or space control is requested to the object control means 16, if necessary, the object control means 16 reads out the time control functional formula or space control functional formula from the object 15, and sends them to the time control means 18 and the space control means 19, respectively. The time control means 18 and the space control means 19 store them. Furthermore, the object control means 16 sends command 524 to the time control means 18 requesting to control the timer generation means 17. The time control means 18 controls the timer generation means 17 according to the time control functional formula. Here, the relative time is converted to the absolute time. Concerning the space control, similarly, the object control means 16 requests the position calculation to the space control means 19, and the space control means 19 calculates the position according to the space control functional formula, and sends the result to the object control means 16. Here, the relative space is converted into an absolute space. The object control means 16 receives such data, and sends data to the interpretation execution means 4.

Figure 6:
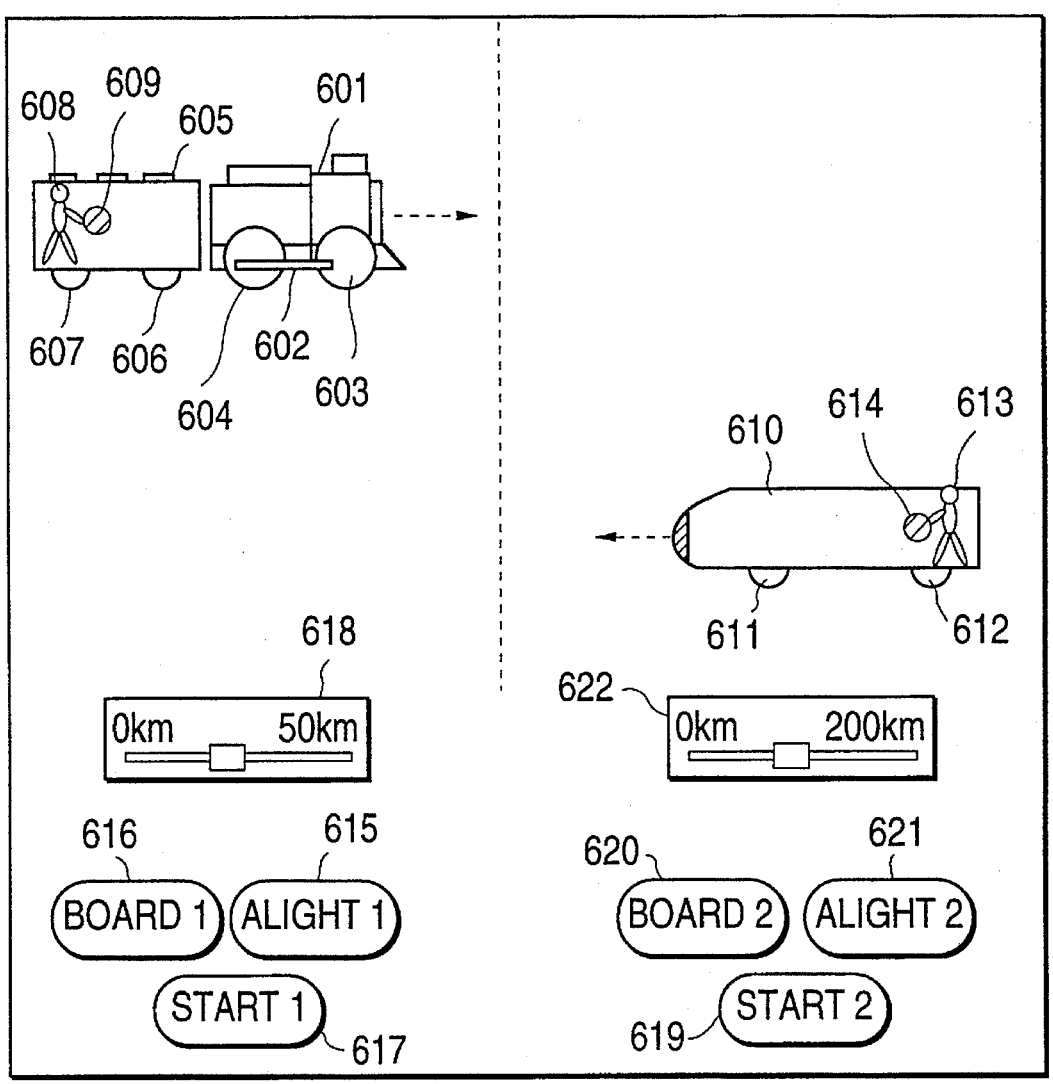
FIG. 6 is an explanatory diagram showing a model example used in the fifth embodiment.
Figure 7:
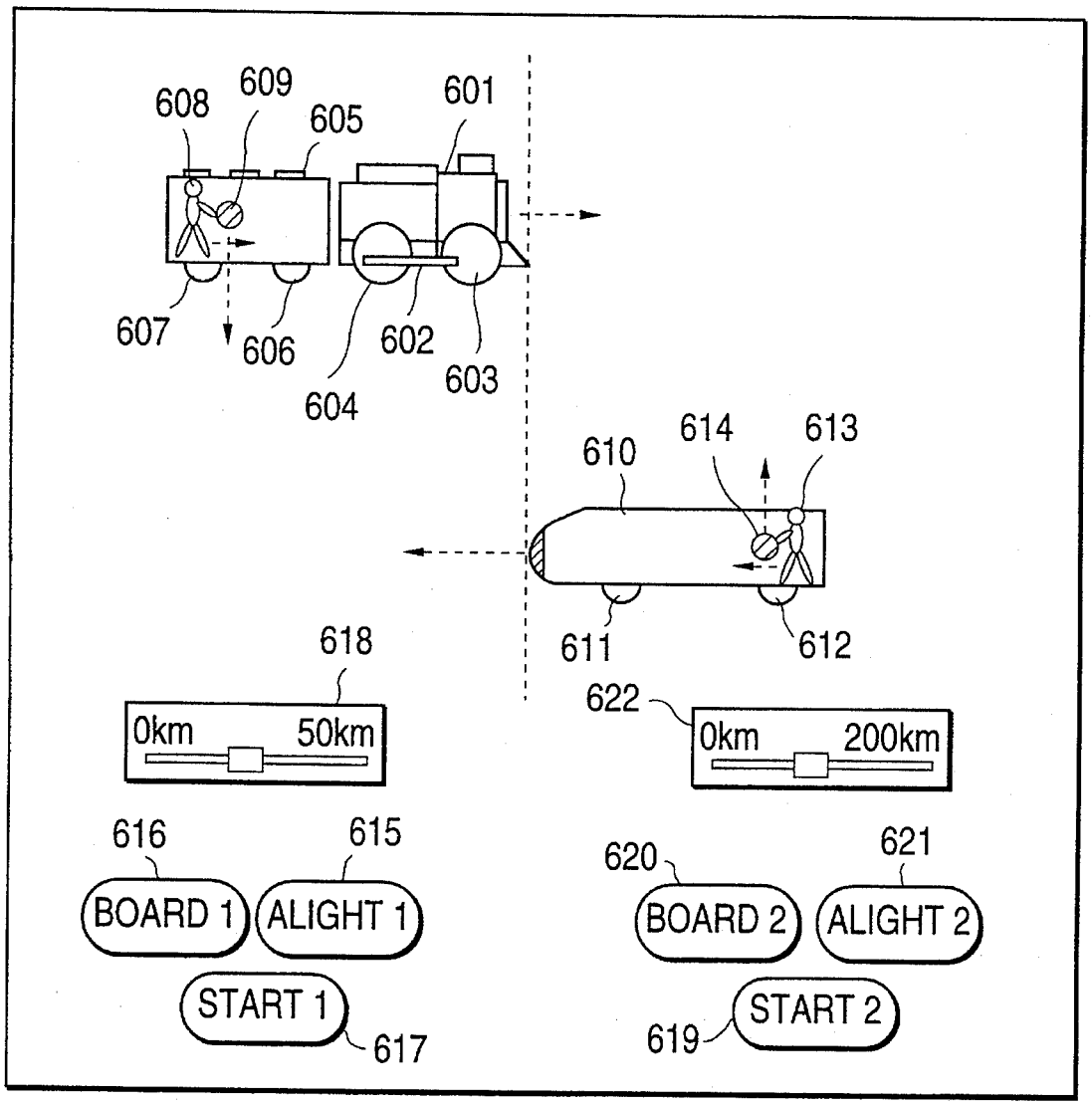
FIG. 7 is an explanatory diagram showing a model example used in the fifth embodiment.
Figure 8:
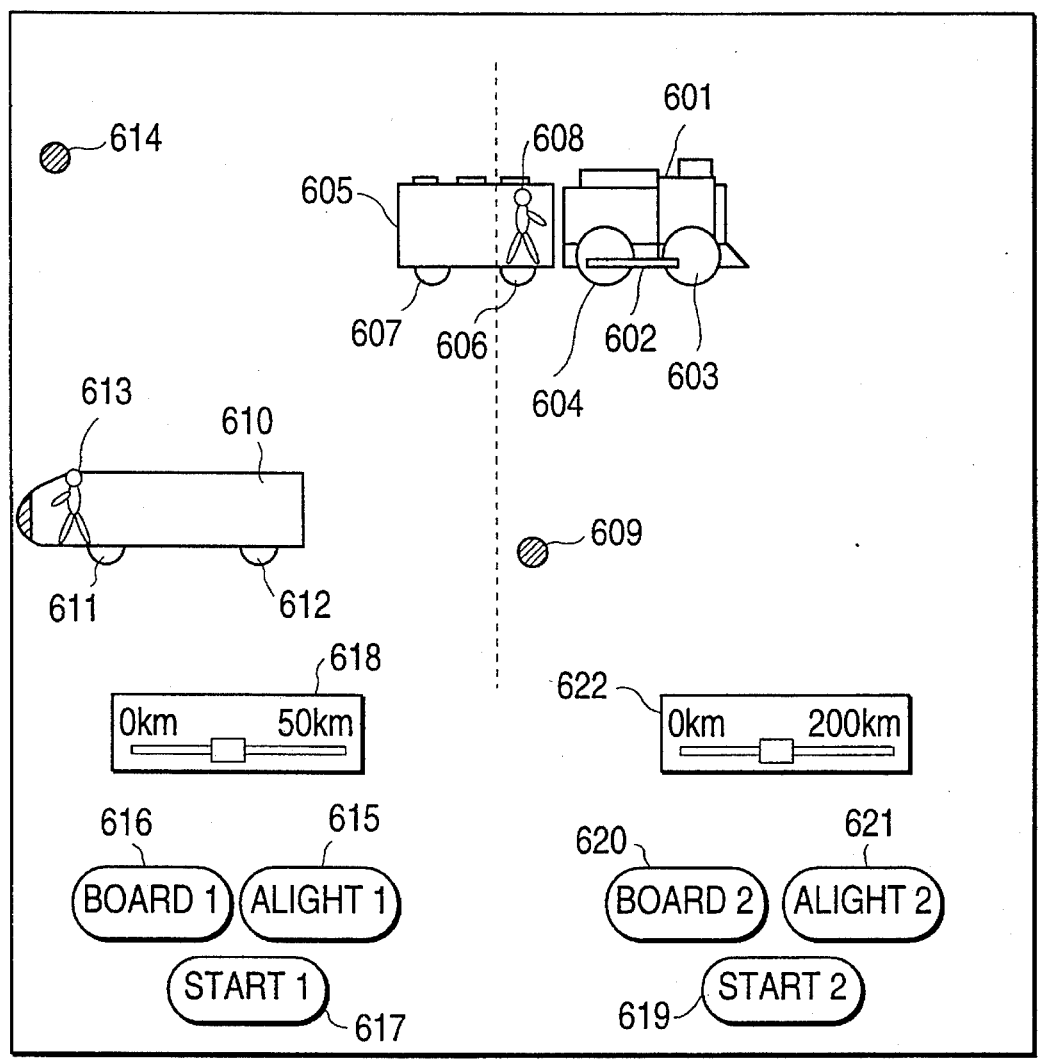
FIG. 8 is an explanatory diagram showing a model example used in the fifth embodiment.

Setting a practical model, the fifth embodiment is further described below. In FIG. 6, numeral 601 is an SL main body, 602 is a crank bar, 603 is a front wheel of an SL, 604 is a rear wheel of an SL, 605 is a passenger car main body, 606 is a front wheel of a passenger car, 607 is a rear wheel of a passenger car, 608 is man 1, 609 is ball 1, 610 is a bullet train main body, 611 is a front wheel of a bullet train, 612 is a rear wheel of a bullet train, 613 is man 2, 614 is ball 2, 615 is an alighting button of SL, 616 is a boarding button of SL, 617 is a start button of SL, 618 is speed setting scale of SL, 619 is an alighting button of bullet train, 620 is a boarding button of bullet train, 621 is a start button of bullet train, 622 is a speed setting scale of bullet train. In FIGS. 7 and 8, items indicated by numerals are the same as in FIG. 6. In the animation model of this example, by pressing the start buttons, the SL and the bullet train begin to move at predetermined speed individually, and when the positions in the lateral direction of the heads of the SL and bullet train are matched, balls are thrown out and people begin to walk forward, and when people reach the heads, the SL and the bullet train are stopped. While the SL and bullet train are moving, their speed can be changed. The operation of this model is described below referring to the drawing.

First, as the object creation processing procedure of the initial state, a main script as shown in FIG. 12 is contained in the object 15. The initial setting execution means 21 generates an event of script execution from the object "mainframe" in order to execute the main script, and transfers the control to the information presentation execution means 7. The event control means 6 registers the event issued by the initial setting execution means 21, and since only this event is present right now, the event control means 6 transfers the control to the interpretation execution means 4, and the interpretation execution means 4 sends a request command to the object control means 16 to read in the main script from the object "mainframe." Receiving it, the object control means 16 reads out the main script from the object "mainframe" and sends it to the interpretation execution means 4.

The interpretation execution means 4 reads and interprets (1). (1) is a command, demanding to "make the main body of SL as a child of object mainframe," and the interpretation execution means 4 sends it to the object control means 16. The object control means 16 executes the command sent from the interpretation execution means 4, and the object "main body of SL" is created consequently. The object control means 16 registers the object "main body of SL" in the object control table in the object control means. The object control means 16 requests the output control means 9 to display the object "main body of SL" on the screen, and sends a notice of completion of execution to the event control means 6, thereby returning the control to the information presentation execution means 7.

The information presentation execution means 7 requests the event control means 6 to check if the event is present or not. At the present, since only one event is present, the information presentation execution means 7 requests the interpretation execution means 4 to resume execution of the main script. The interpretation execution means 4 interprets (2), and sends the result command to the object control means 16. By the same processing as mentioned above, the control is transferred to the information presentation execution means 7.

Afterward, (3) and (4) are similarly executed. Next, the interpretation execution means 4 interprets (5), and sends a command to the object control means 16. This is a command for changing hierarchical structure of the object, and the object control means 16 creates the object "SL" as a child of the object "mainframe" and changes the objects of (1) to (4) to the child of object SL. Sending a notice of end of execution to the event control means 11, the control is transferred to the information presentation execution means 7.

Similarly, from (6) to (28), objects are created afterward. Then the processing of the main script is over, and the interpretation execution means 4 sends a command of event deletion to the event control means 6. Receiving it, the event control means 6 deletes this event. As a result, no event is registered now, and the information presentation execution means 7 waits until any event is sent in. At this time, the screen is as shown in FIG. 6.

Here, when the user presses the "boarding 1" button, the interactive processing input means 2 sends the event that the object "boarding 1" is pressed to the event control means 6. The event control means 6 registers this event, and transfers the control to the interpretation execution means 4 because only this event is existing at the present, and the interpretation execution means 4 requests the object control means 16 to read the script written on the object "boarding 1." This script is shown in FIG. 13.

The interpretation execution means 4 search for the portion to be executed when an event in which a mouse is pressed, occurs. It's (29), and hence (29) is interpreted, and is sent to the object control means 4. By the execution of (29), man 1 and ball 1 are taken on board the steam locomotive. The script ends with this, and this event is deleted by the command from the interpretation execution means 4.

When "boarding 2" is pressed, in the same way as when "boarding 1" is pressed, man 2 and ball 2 are taken on board the bullet train. "Boarding 2" bears the script as shown in FIG. 14. When the start button 1 is pressed, the interactive input means 2 sends the event to the event control means 6, and the event control means 6 registers this event, and since only this event exists at the present, the control is transferred to the interpretation execution means 4, and the interpretation execution means 4 requests the object control means 16 to read the script written on the object "start button." This script is shown in FIG. 15.

The interpretation execution means 4 searches for the portion to be executed when the event in which a mouse is pressed, occurs. It's (31), and (31) is interpreted, and is sent it to the object control means 16. The object control means 16 takes out the time control functional formula $v1(t)$ from the object, sends it to the time control means 18, also takes out the space control functional formula, and sends to the space control means 19. The time control means 18 stores $v1(t)$, and calculates the timer interval by the time control functional formula $v1(t)$, and sends a timer generation command to the timer generating means 17. The timer generating means 17 receives it and upon coming to a set time issues an event, and sends it to the event control means 6. The space control means 19 stores the space control functional formula. The script ends here, and the event that the start button was pressed, is erased by the command from the interpretation execution means 4.

When the preset time expires, an event is issued by the timer generating means 17, and the information presentation execution means 7 requests the execution to the object control means 16. The object control means 16 requests the position calculation to the space control means 19. The space control means 19 calculates the position, and sends the data to the object control means 16. The object control means 16 requests again the time control means 18 to control the timer generating means 17, and requests the output control means 9 to display. The output control means 9 displays the object on the screen. This is repeated to move the object.

Furthermore, when the start button 2 is pressed, similarly, the bullet train moves. By the event control means 6, even when plural events exist like this, they are executed sequentially, so that plural objects may be moved and changed simultaneously.

The steam locomotive, the bullet train, man 1, and man 2 are instructed, when they are moved to issue an event notifying the moving, and when moved in the preceding step, the event is issued. The processing executed by this event is described in the individual objects. They are shown in FIGS. 16 to 18.

When the bullet train moves, the object control means 16 issues the event, and the event control means 6 registers it. When the execution of the event comes to its turn, the event control means 6 transfers the control to the interpretation execution means 4. The interpretation execution means 4 requests the object control means 16 to read the corresponding script, that is, (32) to (37), and (32) is interpreted. The interpretation execution means 4 requests the object control means 4 to investigate the lateral positions of the steam locomotive and bullet train. The object control means 16 investigates them, and sends the data to the interpretation execution means 4. The interpretation execution means 4 investigates whether these two values coincide or not. If not coinciding, the script ends here, and the control is transferred to the information presentation execution means 7. The event control means 6 searches for the event to be executed next, and requests the object control means 16 or interpretation execution means 4 to execute. If coinciding, (33) to (37) are executed. As a result, man walks in the train, and a ball is thrown vertically to the running direction of the train.

Thus is easily created an animation in which plural objects are handled together on the time space and are handled also independently. It is also easy to create an animation of high interactive property as described above in which the walking timing of man varies if the train moving speed is changed.

When these information operations and mutual actions are described in the simplified interpreter type language, it is possible to change without recompiling in the process of development of presentation software, so that the number of processes for development may be notably decreased.

(Sixth Embodiment)

As a sixth embodiment of the invention, a presentation information creating apparatus for creating the information using the multimedia information as the source is explained below by reference to FIG. 24.

This information creating apparatus, unlike the conventional apparatus, which does not possess control function of the real time processing of multimedia information, performs time control, event control, and control of execution unit for processing procedure so that the real time processing may be controlled flexibly during execution of information presentation. In the sixth embodiment, too, the constituent elements having the same functions as in the first embodiment are identified with corresponding reference numbers, and their explanations are omitted.

Figure 24:
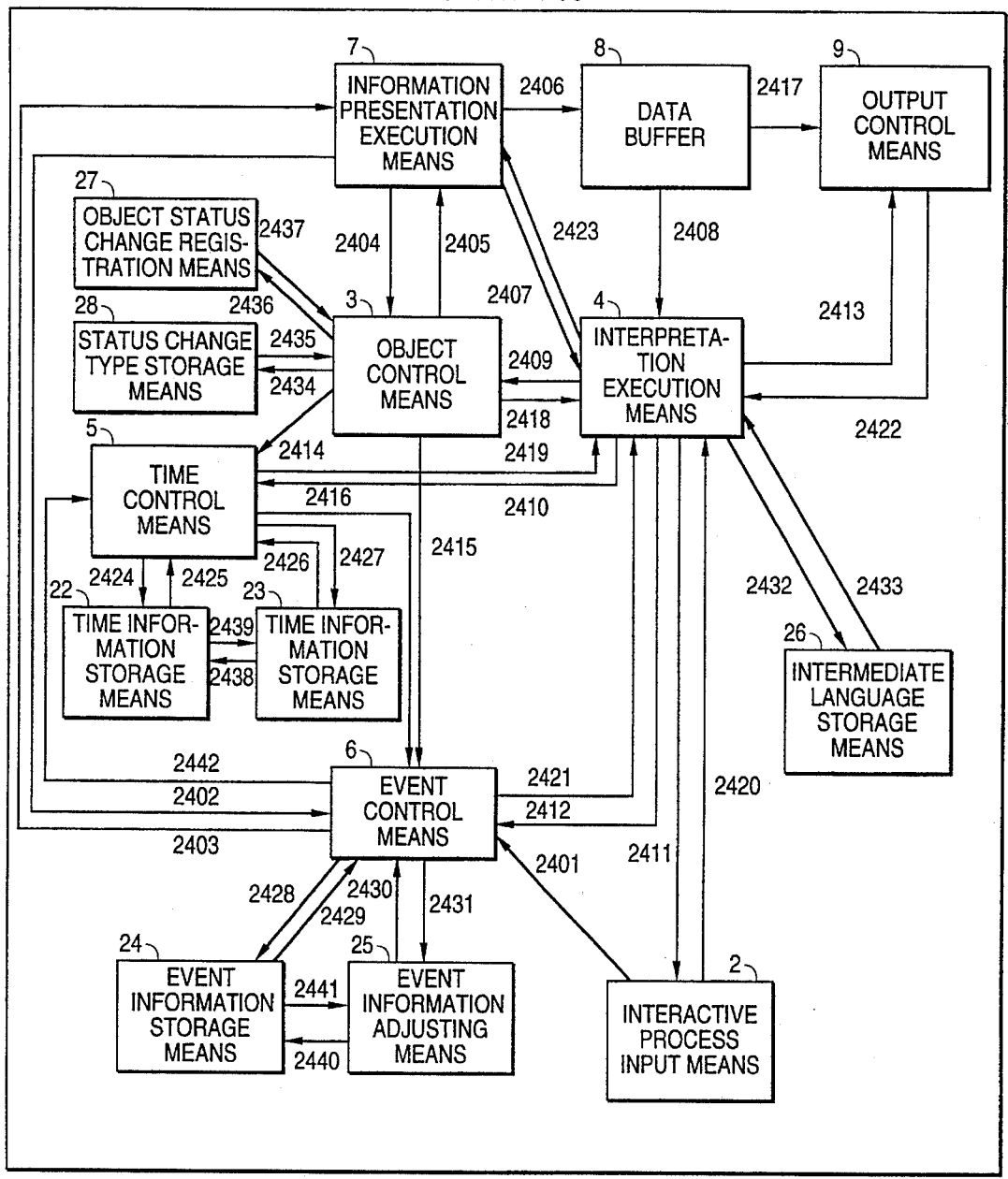
FIG. 24 is a block diagram showing the constitution of a presentation information creating apparatus in a sixth embodiment.

In FIG. 24, numeral 22 is a time information storage means for receiving the time control instruction issued from the interpretation execution means 4 or object control means 3, and storing the time control information for information presentation. More specifically, for example, as time control information, the pointer of the object having issued the timer, an interval of timer interruption, specification of start time of timer, number of times of repetition, timer precision, and time control instruction information such as unit information presentation processing time for drawing or the like to be executed when one timer is issued, are stored as many as the number of times issued.

Numeral 23 is a time information adjusting means for adjusting the information stored in the time information storage means 22 depending on the execution status of the information presentation. For example, when desired to start up plural objects by applying timer interruptions simultaneously, time delay occurs in a single process, inevitably. Accordingly, the time information adjusting means 23, to minimize the delay, for example, changes the sequence so that processing from those shorter in the unit information presentation processing time for drawing and so on can be made, when applying timer interruptions simultaneously, or changes timer interruption intervals, and controls the information stored in the time information storage means 22. The timer information adjusting means 23 may be operated automatically by algorithm, or by dialog with the user.

Numeral 24 denotes an event information storage means for storing event information such as the input event issued from the interactive processing input means 2, timer interruption event issued from the time control means 5, object operation status change event issued from the object control means 3. Practically, for example, the information about the type of event such as, whether it is an input event or timer interruption event, the information about priority order and weighting for executing the event, pointer to the object having issued the event, the flag information of effective event or not, and the flag information whether it is of event losing efficacy with the passing of the time or not, and others is stored as many as the number of events issued.

Numeral 25 is an event information adjusting means for adjusting the information stored in the event information storage means 24 depending on the execution situation of the information presentation. For example, when the event priority order or weighting is changed depending on the processing quantity or processing speed of the execution processing, or when the once effective event loses its efficacy as time passes, for example, if a timer interruption event is issued to the object, the event information is changed to make the previous timer interruption invalid when the same timer interruption is issued to the same object before the event is executed.

Numeral 26 is an intermediate language storage means for receiving the information necessary for interpretation and execution of the procedure part and storing the information converted into an intermediate language corresponding to machine language. Specifically, the specified flag information of parallel or serial mode, information about header information such as specification of single execution unit such as whether it is in script unit, intermediate language unit, or in time unit, and how many number of command or intermediate language can be processed in one execution, and others, and the information of simplified script converted into intermediate language corresponding to machine language are stored as many as the number of parallel objects. The header information may be also stored in the information presentation execution means 7 or event control means 6, but, in this embodiment, it is stored in the intermediate language storage means 26.

Numeral 27 is an object status change registration means for registering only those objects of which status change of the objects must be investigated. Here, the object name and status change type, such as "Collision" and "Move" are registered.

Numeral 28 is astatus change type storage means for storing the information consisting of a pair of status type corresponding to the status change type of the object and algorithm. For example, if the status change type is "Collision," the status change type is the position change of the object, and the algorithm is the algorithm for detecting collision of two objects.

Numeral 2401 to 2442 show paths of control data, commands, data, and others. These names show typical contents to be transmitted for the sake of convenience, and actually various contents are transmitted depending on the circumstance regardless of the names.

In this constitution, for example, the information presentation of interactive animation is effected as follows. First, the information presentation execution means 7 sends control data 2407 to the interpretation execution means 4 in order to obtain the object name for information presentation from the user, and the interpretation execution means 4, receiving it, sends command 2411 to the interactive processing input means 2. When the object name is entered, the interactive processing input means 2 sends a notice of completion of input and object name to the event control means 6 as data 2401.

The event control means 6 registers the received data 2401 in the event information storage means 24 as data 2428. The information presentation execution means 7 sends an event requesting command 2402 to the event control means 6, and receiving this command, the event control means 6 receives the data 2429 in the object ,name as event information from the event information storage means 24, and sends the command 2403 for taking out the object to the object control means 3 as data 2403, and the object relating to the event information is taken out from the object control means 3 as data 2405, and data 2406 of data part and processing procedure of the pertinent object is transferred to the data buffer 8, and the control is transferred to the interpretation execution means 4 by control data 2407.

Receiving it, the interpretation execution means 4 refers data buffer 8 with data 2408, and interprets the processing procedure of the object, translates into an intermediate language corresponding to the machine language, and stores it as data 2432 in the intermediate language storage means 26. The interpretation execution means 4 repeats this series of jobs to translate into the intermediate language processing procedures to be newly referred to the data buffer 8 run out, and when it is known by data 2408 that there is no more new data to be referred to the data buffer 8, command 2432 is sent to the intermediate language storage means 26 in order to take out the processing procedure to be executed next, and the intermediate language storage means 26, receiving it, sends it to the interpretation execution means 4 as data 2433.

Receiving it, the interpretation execution means 4 requests execution to the object control means 3 with command 2409, to the time control means 5 with command 2410, to the interactive processing input means 2 with command 2411, to the event control means with command 2412, or to the output control means 9 with command 2413, depending on the type of the processing procedure.

The object control means 3, receiving the request, in order to investigate if it is necessary to notice the operation status change of the object during command execution depending on the type of command, sends command 2436 to the object status change registration means 27, refers it with data 2437, sends command 2434 to the status change type storage means 28, refers it with data 2435, sends, if necessary, command 2415 for telling the status change of the object during command execution to the event control means 6, or sends command 2414 for generating a new timer to the time control means 5, and returns the control to the interpretation execution means 4 with control data 2418.

The requested time control means 5 stores the time control information in the time information storage means 22 as data 2424, executes the processing corresponding to the command type, and while notifying end of execution to the interpretation execution means 4 with control data 2419, controls the timer interruption referring to the time control information stored in the time information storage means 22 with data 2425, and sends command 2416 to the event control means 6 when a timer interruption occurs. Or when it is necessary to cause timer interruption on plural objects simultaneously, the time control means 5 transfers the control to the time information adjusting means 23 with control signal 2427, and the time information adjusting means 23 given the control refers the information stored in the time information storage means 22 with data 2439, and adjusts the information if necessary, and stores as data 2438 in the time information storage means 22, and transfers the control to the time control means 5 with control signal 2426. Afterwards, the time control means 5 transfers the control to the interpretation execution means 4 with control signal 2419.

The requested interactive processing input means 2 sends data 2401 to the event control means 6 after execution of command, and transfers the control to the interpretation execution means 4 with control data 2420. The event control means 6 stores the event information sent from the interpretation execution means 4, object control means 3, time control means 5, or interactive input means 2, in the event information storage means 24 with data 2428, and executes the command by referring with data 2429, and later with control data 2421, and also, the output control means 9 transfers the control to the interpretation execution means 4 with control data 2422 after command execution. Besides, the event control means 6 transfers the control to the event information adjusting means 25 with control signal 2431, if there are plural events that can be executed simultaneously, or if it is necessary to change the execution priority order of events, and the event information adjusting means 25 given the control refers the event information from the event information storage means 24 with data 2441, adjusts the event information depending on the execution situation, stores it as data 2440 in the event information storage means 24, and transfers the control to the event control means 6 with control signal 2430. Afterwards, the event control means 6 transfers the control to the interpretation execution means 4 with control signal 2421.

The interpretation execution means 4 given the control repeats interpretation of processing procedure and execution until the pertinent processing procedures run out, then transfers the control to the information presentation execution means 7 with control data 2423, and the information presentation execution means 7 given the control sends again event requesting command 2402 to the event control means 6, thereby repeating the series of processings to progress the information presentation. Meanwhile, in order to accept such asynchronous interruption, the event control means 6 and the time control means 5 are designed to be executed in separate processes.

As a more specific example of operation for information presentation, the operation for display of animation as shown in FIG. 5 is explained. First, the information presentation execution means 7 sends control data 2407 showing a command to the interpretation execution means 4 in order to obtain the object name for information presentation from the user. For example, assuming that the command content is an input request command in the object name of "input object-name presentation, the interpretation execution means 4, receiving it, sends command 2411 to the interactive processing input means 2.

When the object name is entered, the interactive processing input means 2 sends a notice of input completion and object name to the event control means 6 as data 2401. The event control means 6 registers the received data 2401, and the information presentation execution means 7 sends an event requesting command 2402 to the event control means 6, and receives data 2403 in the object name as event information from the event control means 6, sends command 2404 for taking out the object to the object control means 3, and takes out the object relating to the event information from the object control means 3 as data 2405, and transfers the data 2406 of data part and processing procedure of the pertinent object to the data buffer 8. For example, suppose the processing procedure as shown in FIGS. 20, 26, 22 are transferred to the data buffer 8. The information presentation execution means 7 transfers the control to the interpretation execution means 4 with control data 2407.

First, the interpretation execution means 4 refers the data buffer 8 with data 2408, interprets the processing procedure of the object, detects that it is composed of four blocks, "mainframe" block of (51) to (59), "On Mouse Down" block of (70), "On Mouse Down" block of (71), and "On Collision meteor and earth" block of (62) to (67), translates into intermediate language corresponding to machine language by each block, and stores in the intermediate language storage means 26 as data 2432. The interpretation execution means 4 repeats this serial jobs of translating into intermediate language until processing procedures to be newly referred to run out in the data buffer 8.

Figure 27:
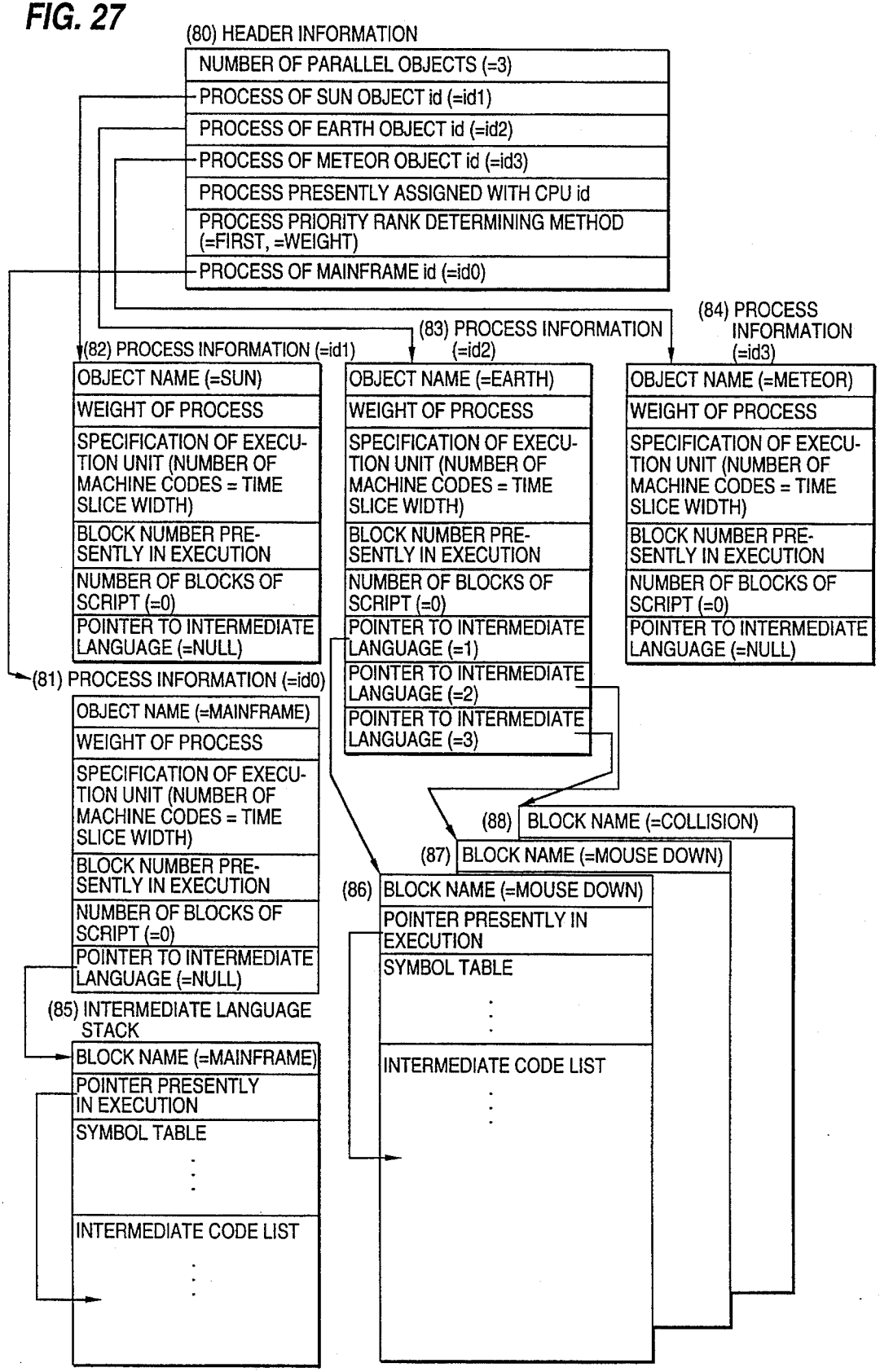
FIG. 27 is an explanatory diagram showing an example of being stored in intermediate language storage means in the sixth embodiment.

A practical example of data stored in the intermediate language storage means 26 is shown in FIG. 27. In the header information of (80), the number of parallel objects, process number of each process, process number with which the CPU is presently assigned, process priority order determining method, and others are stored. In the case of this example, the number of parallel objects is three, and the three process numbers are Sun object for id1, earth object for id2, and meteor object for id3.

Meanwhile, the process number id0 is compulsorily assigned to the process number for mainframe, and hence it is not included in the quantity of the parallel projects. In the process priority order determining method, a method of determining process execution order is stored, and there are, for example, a First time for executing the processes sequentially from the first one, a Weight type of determining priority order by processing quantity and processing speed per unit of the object and others. In the process information of (81), (82), (83), (84) corresponding to the process numbers, the object name of the entity of the process, weight of the process, specification Of execution unit, block number presently in execution, number of script blocks adhered to one object, pointer to the intermediate language stack of each block, and others are stored. The weight of the process is referred to when the process priority order determining method stored in the header information is the Weight type. Specification of execution unit is to change over the process at which timing by specification of execution unit given to one object, and for example it is controlled by the machine code quantity width or time width.

The intermediate language stacks of (85), (86), (87), (88) are created as many as the number of script blocks, and each intermediate language stack stores block names such as mainframe and Mouse Down, intermediate language stack pointer presently in execution, symbol table for controlling symbols such as variables and constants, intermediate code list composed of a set of intermediate codes converted into intermediate codes corresponding to machine language from the script such as Pop and Push, and other information.

When it is known that there is no more new data to be referred to in the data buffer 8 by detecting data 2408, command 2412 is sent to the event control means 6 to register four events, that is, "mainframe" event, "On Mouse Down" event, "On Mouse Down" event, and "On Collision" event. At this time, the header information stored in the intermediate language control means 26 is also sent to the event control means 6 as required. The event control means 6, receiving it, registers these four events in the event information storage means 24 with data 2428 as event information. Of these four events, in order to execute from the processing procedure (51) to (59) corresponding to the "mainframe" event that is set to be executed in the first place, the control is transferred to the interpretation execution means 4 with control data 2421.

The interpretation execution means 4 given the control changes over to the process corresponding to the "mainframe" event with control signal 2432, and interprets and executes the corresponding processing procedure successively referring to with data 2433. First, the interpretation execution means 4 interprets to create an object, ball with the intermediate language corresponding to (51), and to create a ball in the name of Sun, create command 2409 is sent to the object control means 3. Receiving it, the object control means 3 creates an object, and transfers the control to the interpretation execution means 4 with control data 2418.

The interpretation execution means 4, same as in the processing procedure of (51), repeats interpretation and execution request of (52), (53), and creates objects of earth and meteor. With (54) to (56), the interpretation execution means 4 sends command 2409 for setting the individual object positions to the object control means 3, and with (57) to (59) the interpretation execution means 4 sends command 2409 for setting the individual object colors to the object control means 3. Sending also command 2413 to the output control means 9, these objects are displayed.

Here, all processing procedure of "mainframe" is over, and the interpretation execution means 4 tells end of processing procedure of the "mainframe" event to the event control means 6 with control command 2412, and transfers the control to the event control means 6. The event control means 6 erases "mainframe" event from the already registered event information, and transfers the control to the information presentation execution means 7 with control data 2403.

The information presentation execution means 7, in order to obtain a next effective event, issues command 102 to the event control means 6, and transfers the control to the event control means 6. At present, there is no valid event, and a waiting state is held. Suppose the user clicks the mouse button at the position where "earth" is displayed in the output means 9. Here, the interactive processing input means 2 sends input information to the event control means 6 with data 2401, and refers the event information stored in the event information storage means with data 2429, and it is registered in the event information storage means 24 with data 2428 that the two "Mouse Down" events of the earth object are true. The event control means 6, in order to execute the processing procedure corresponding to the presently valid event, tries to transfer the control to the interpretation execution means 4, but since plural valid events are present, the control is transferred to the event information adjusting means 25 with control signal 2431.

The event information adjusting means 25 given the control refers the information stored in the event information storage means 24, process priority order determining method or other information with data 2441, adjusts priority order of the event execution, registers in the event information storage means 24 with data 2440., and transfers the control to the event control means 6 with control signal 2430. For example, supposing the execution priority order of the first "Mouse Down" event is high, the event control means 6 transfers the control to the interpretation execution means 4 with control data 2421 in order to execute the processing procedure (70) corresponding to this event.

The interpretation execution means 4 given the control takes out the processing corresponding to (70) from the intermediate language storage means 26 with data 2433, and requests the time control means 5 to send command 2416 for issuing timer interrupt event at every specific interval Δt by command 2410, and registers "move" event in the event control means 6 with command 2412. When a timer interrupt event is issued from the time control means 5 with command 2416, the event control means 6 registers the event as data 2424 in the time information storage means 22. The event control means 6 controls execution status and execution order of the registered events. The presently valid events include "Mouse Down" of (71) aside from (70), and it is processed the same as (70).

The time information storage means 22 stores the time information about two timers. Since the time information is available in two types, to determine which timer should first issue the timer event, the control is transferred to the time information adjusting means 23 with control signal 2427. The time information adjusting means 23 given the control refers the information stored in the time information storage means 22 with data 2439, stores the adjusted result in the time information storage means 22 with data 2438, and transfers the control to the time control means 5 with control signal 2426.

For example, considering the processing quantity required in one drawing process of earth and meteor, since the processing quantity of the meteor is smaller, the timer interrupt event for the meteor is issued first, then the timer interrupt event for the earth is issued, and the control is transferred to the event control means 6 with control signal 2416. The event control means 6 given the control requests the interpretation execution means 4 to execute the event. The interpretation execution means 4 calculates the position of the object meteor, and sends command 2413 to the output control means 9 requesting for screen output, and transfers the control to the information presentation execution means 7 with control signal 2423. The information presentation execution means 7 given the control transfers the control to the event control means 6 with control signal 2402, and the event control means 6 refers the information stored in the event information storage means 24 with data 2429, and selects the event to be executed next.

Here, the timer interrupt event issued from the second timer created for moving the earth is valid, and to execute it, the control is transferred to the interpretation execution means 4 with control signal 2421, and a series of processing is done. The time control means 5 sends the timer interrupt event with data 2416 to the event control means 6, in every interval of timer interruption registered in the time information storage means 22. However, for example, if the timer interval is too narrow, or the number of objects to be executed in parallel is too many, unexecuted valid events are accumulated in the event storage means 24, to finally exceed the limit of processing.

Accordingly, when unexecuted timer events are accumulated in the event information storage means 24 beyond the limit, the event control means 6 transfers the control to the event information adjusting means 25 with control signal 2431, and the content of the event information storage means 24 is adjusted with data 2440, so that, for example, the first issued timer interrupt event may be invalidated if plural events issued from the same timer are left unexecuted, and then the control is transferred to the event control means 6 with control signal 2430.

If it is not enough yet, the event control means 6 receives that information from the event information adjusting means 25 as data 2430, and on the basis of it, in order to adjust the width of the timer interval, the control is transferred to the time control means 5 as data 2442. The time control means 5 given the control transfers the control to the time information adjusting means 23 with control signal 2427, and the time information adjusting means 23 given the control refers the timer interval stored in the time information storage means 22 with data 2439, and adjusts to widen the interval within the allowable range, and stores it in the time information storage means 22 with data 2438, and transfers the control to the event control means with control signal 2416. Afterwards, the event control means 6 gives the execution right to the events of (70), (71) at every timer interruption, and the above processing is done, and this is repeated, and the animation of moving meteor and earth are displayed. When the meteor and earth collide, the object control means 3 notifies the event "collision" with command 2415 to the event control means 6.

Receiving it, the event control means 6 registers this event, and, if (70) and (71) are presently in the midst of processing to be done at every Δt, after execution of unit processing, transfers the control to the information presentation execution means 7 with control data 2403. The information presentation execution means 7 given the control issues command 2402 to obtain a next valid event, and transfers the control to the event control means 6.

At present, the valid event is "Collision meteor and earth," and the event control means 6 transfers the control to the interpretation execution means 4 with control data 2421 in order to execute the processing procedure from (62) to (67) corresponding to this event. The interpretation execution means 4 given the control puts the position of the object meteor into the variable "position" with (62), and sends a notice of end of execution of one line to the event control means 6. The event control means 6, after end of execution of (70), (71), requests execution of the event "collision" to the interpretation execution means 4. Hereinafter, from (63) to (67), this processing occurs in every line, but this is the same process and its explanation is omitted.

The interpretation execution means 4, in order to erase the objects; meteor and earth with (63), (64), sends command 2409 to the object control means 3, then the object control means 3, receiving it, erases the objects, and returns the control to the interpretation execution means 4 with control data 2418, and ten ball objects are created with (65) by the same processing. Sending command 2413 to the output control means 9, these objects are erased or displayed.

The procedure at this time is the same as in (51) to (53), and its explanation is omitted. In this case, however, since multiple objects are created, the same processing as in (51) to (53) is done every time one object is created. Next, with (66), asteroid created in (65) is put in the place of variable "position." with (67), centered around "position," ten pieces of asteroid ?? are removed radially. The processing at this move is also the same as in (70), (71).

This ends the processing of the event "collision," and the interpretation execution means 4 notifies the end of processing procedure of "Collision" event to the event control means 6 with control command 2412, and transfers the control to the event control means 6. The event control means 6 refers the information stored in the event information storage means 24 with data 2429, and erases the "Collision" event out of the already registered event information from the event table, and stores it as data 2428 in the event information storage means 24.

Meanwhile, as for the processing of event "collision" issuing, the event which may be possibly executed at the time of creation of each object is read first. In this case, the data of (61) to (67) described above are read first, and the executable events Mouse Down, Collision are registered in the reservation event table, and as for Collision, the information presentation execution means 7 prepares for the Collision event issuing. This is to notify meteor and earth to check the positions mutually when changing the position.

That is, the information presentation execution means 7 requests to the object control means 3 with command 2404 to detect collision of the objects; meteor and earth, and the object control means 3 receiving the request, registers the data 2436 in the object status change registration means 27 so as to detect by concentrating on the corresponding status change of the pertinent object. Also, in the case of Collision, for example, since a paired information of the type of status change (position change) and algorithm to be executed at that time is stored in the status change type storage means 28, the object control means transfers the control to the status change type storage means 28 with control signal 2434, and the status change type storage means 28 given the control transmits the stored information therein by data 2435. Thus, limiting to the information registered in the object status change registration means 27, status change of the object is detected, so that unnecessary processing may be omitted. Besides, the status change type storage means 28 is separately provided, and it is flexible to cope with status change type of a new object.

In the above embodiment, an example of displaying animation is shown for simplicity of explanation, but it is possible to present in the same processing if the object of presentation is video image, recorded sound, or their combination with animation.

Thus, according to the embodiment, since processing mechanism for real time processing is added to time control, event control, and interpretation execution means, animation higher in precision than before may be executed.

(Seventh Embodiment)

As a seventh embodiment of the invention, an information presentation apparatus for presenting information using multimedia information as the source is explained by reference to FIG. 25.

This information presentation apparatus possesses the mechanism for storing and controlling the multimedia information efficiently and structurally, and therefore different information media such as text, characters, picture, image, and sound can be handled uniformly, and basic processing procedure systems necessary for presentation of information of individual media, such as drawing, move, enlargement, reduction, and color mapping are provided by the system, so that applications of information presentation may be created easily.

In the seventh embodiment, the constituent elements possessing the same functions as in the first embodiment are identified with corresponding numbers, and their explanations are omitted.

Figure 25:
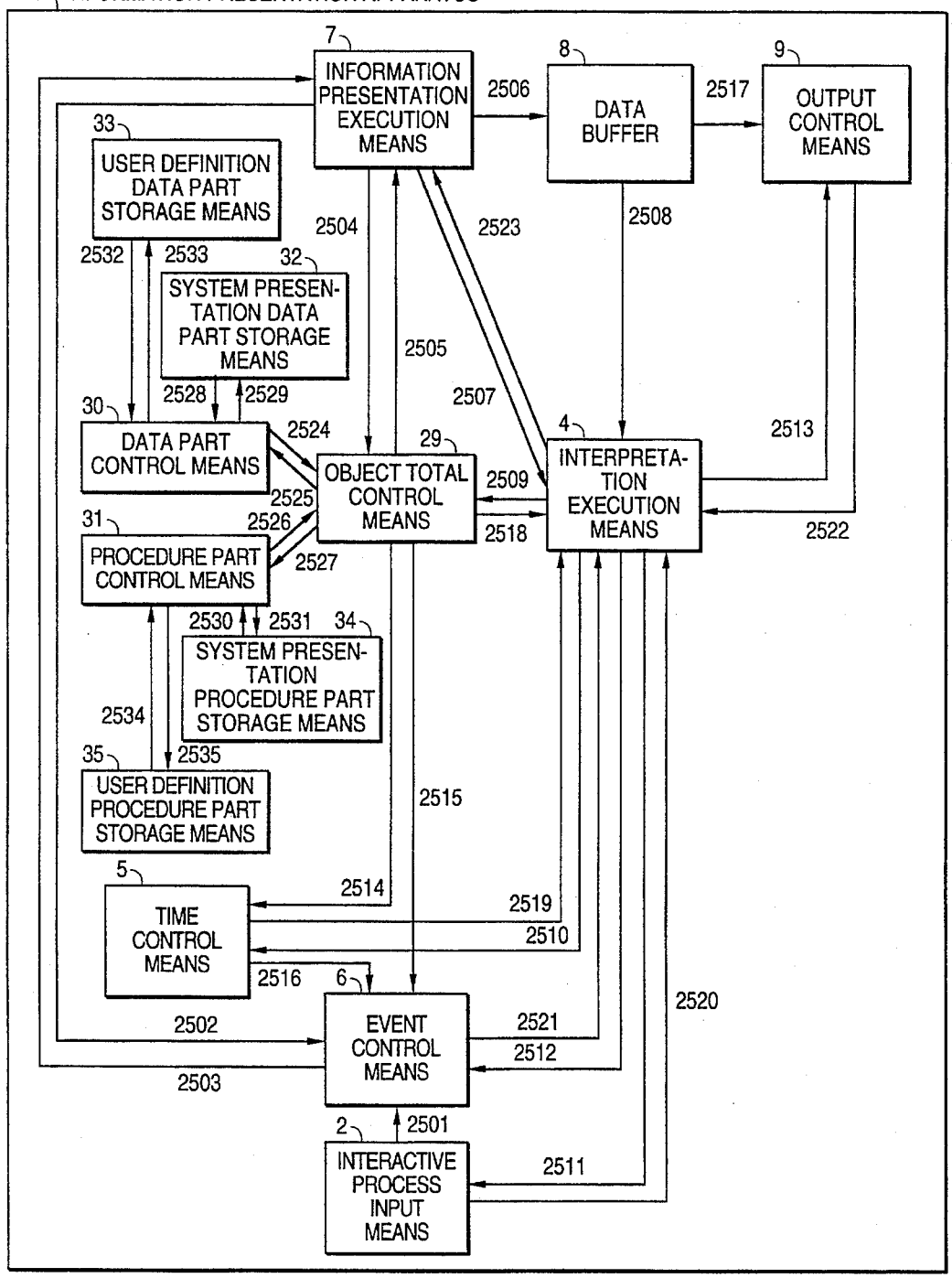
FIG. 25 is a block diagram showing the constitution of an information presentation apparatus in a seventh embodiment.

In FIG. 25, numeral 29 is an object total control means for controlling the unified object composed of two pointers; the pointer to the data part showing the content of the information presentation, and the pointer to the processing procedure part for storing external instructions during information presentation, mutual relations of objects of presentation, and conditions about information presentation for time lapse. The unified object composes an autonomous object including the information about the content of the information presentation, and the behavior in its own information presentation. Being controlled by the pointer to the data part, and the pointer to the procedure part showing the behavior on time and space, new information can be presented only by changing over the pointers freely.

For example, suppose an unified object is composed of a pointer to data part of a picture of a fish, and a pointer to procedure part of swimming manner of the fish. If, for example, the pointer to data part of the fish picture is replaced by text A, the text A presents the information in the same manner as the fish.

Numeral 30 is a data part control means for controlling data part depending on the media of information about text, characters, picture, image and sound, and the basic processing procedure necessary for information presentation of each media, for example, drawing, moving, enlargement, reduction, and color mapping. Numeral 31 is a procedure part control means for storing the conditions about information presentation concerning the instructions from outside during information presentation, mutual relations of objects for presentation, and time lapse. In this embodiment, scripts written in simplified language are controlled. Numeral 32 is a system presentation data part storage means for storing a template library not depending on practical application of the data part depending on the media of information about tet, characters, picture, image and sound, and the basic processing procedure necessary for information presentation of each media, for example, drawing, moving, enlargement, reduction and color mapping.

Numeral 33 is a user definition data part storage means for storing class instance to be defined by the user, on the model of template library presented by the system presentation data part storage means. Numeral 34 is a system presentation procedure part storage means for storing what is prepared in advance by the system as a library, among conditions relating to information presentation on external instructions during information presentation, mutual relation of presentation object, and time lapse. Numeral 35 is a user definition procedure part storage means for storing what is defined by customizing on the library defined originally by the user or presented by the system, among conditions about external instructions during information presentation, mutual relation of presentation objects, and time lapse.

Numerals 2501 to 2535 denote paths of control data, command, data, and others. These names are to show typical contents to be transmitted, for the sake of convenience, and actually various contents are transmitted depending on the situations regardless of these names.

In this constitution, information is presented, for example, as shown below. Suppose, for instance, the processing procedures of (91) to (106) are transferred to the data buffer 8.

```
mainframe;
    Create a image Named Angelfish ItsBehavior          (91)
      AngelScript
    Create a rectangle Named aRect ItsBehavior Fish     (92)
    Swim AngelFish                                      (93)
    FeedFood to AngelFish                               (94)
    Swim aRect                                          (95)
    ReplaceScript AngelFish and aRect                   (96)
    Resize AngelFish                                    (97)
    Swim AngelFish                                      (98)
mainframeEnd
AngelScript;
    Inherit Fish                                        (99)
    method Swim:                                        (100)
      Move Self   x=f(t)     y=g(t)    velocity=200     (101)
AngelScriptEnd
Fish ;
    method Swim:                                        (102)
      Move Self   x=sin(t)   y=cos(t)  velocity=100     (103)
    method FeedFood:                                    (104)
      position = getposition of Food                    (105)
      Move Self   until   position                      (106)
FishEnd
```

Fish End

The initial mainframe blocks (91) to (98) are scripts defining the objects to be used in information presentation, and blocks (99) to (101) are scripts defining the behavior of the second Angelfish. The third fish blocks (102) to (106) are scripts defining the general behavior of fish. Meanwhile, since the mainframe block and Angel Script are the scripts defined by the user, they are stored in the user definition procedure part storage means 35, and Fish script is stored in the system presentation procedure part storage means 34 presented by the system. The same processing as in the first embodiment is omitted, and only the portions relating to storage and control of objects are explained.

When the command of (91) is interpreted by the interpretation execution means 4, it is sent as command 2509 to the object general control means 29, and, receiving the command, the object general control means 29 creates a new unified object in the name of Angelfish. After creating, in order to obtain the pointer of data part, command 2525 is sent to the data control means 30. Receiving the sent command, the data part control means 30 refers the image class object stored in the system presentation data part storage means 32 with data 2528. Furthermore, as the instance of the image class, in the name of Angelfish, it is stored in the user definition data part storage means 33 with data 2533, and the pointer of Angelfish is sent to the object general control means 29 with data 2524.

Receiving the sent information, the object general control means 29 stores it in the pointer of the data part of Angelfish, and sends command 2527 to the procedure part control means 31. Receiving it, the procedure part control means 31 sends command 2535 to the user definition procedure part storage means 35 in order to search for the script "Angel Script." Receiving the command, sequentially, the user definition procedure part storage means 35, in which Angel Script is stored, notices the pointer as data 2534 to the procedure part control means 31. Receiving it, the procedure part control means 31 sends the pointer of Angel Script as data 2526 to the object general control means 29, and the object general control means 29 stores the pointer in the pointer of procedure part of the object unified in the name of Angelfish, and the control is transferred to the interpretation execution means 4 with control signal 2518.

Next, the interpretation execution means 4 interprets the command of (92), and processes same as (91), and sends it as command 2509 to the object general control means 29. Receiving the command, the object general control means 29 creates a new general object in the name of aRect, and sends command 2525 to the data control means 30 in order to obtain the pointer of the data part. Receiving the command, the data part control means 30 refers the rectangle class object stored in the system presentation data storage means 32 with data 2528, and stores it in the user definition data part storage means 33 with data 2533 in the name of aRect as the instance of rectangle class. Furthermore, the pointer of aRect is sent to the object general control means 29 with data 2524.

Receiving the information, the object general control means 29 stores it in the pointer of the data part of aRec, and sends command 2527 to the procedure part control-means 31. Receiving it, the procedure part control means 31 sends the script called Fish to the user definition procedure part storage means 35 as command 2535. Receiving the command, the user definition procedure part storage means 35 tells that the Fish is not stored, to the procedure part control means 31 as data 2534. Receiving the notice, the procedure part control means 31 transfers the control to the system presentation procedure part storage means 34 with control signal 2531. The system presentation procedure storage means 34 searches for the Fish script, and transfers the pointer to the procedure part control means 31 as data 2530, and receiving it the procedure part control means 31 sends the Fish pointer as data 2526 to the object general control means 29.

The object general control means 29 stores the pointer in the pointer of the procedure part of the object unified in the name of aRect, and transfers the control to the interpretation execution means 4 with control signal 2518. The interpretation execution means 4 given the control sends command 2509 to the object general control means 29 in order to execute the command of (93).

Receiving it, the object general control means 29, in order to execute the procedure of swim of Angel Script of Angelfish, sends command 2527 to the procedure part control means 31. The procedure part control means 31 takes out (100), (101) as the data 2534 from the user definition procedure storage means 35, and sends them as data 2526 to the object general control means 29. Receiving it, the object general control means 29 sends data 2518 to the interpretation execution means 4, and transfers the control to the interpretation execution means 4. The interpretation execution means 4 interprets (100), (101), and practically executes command (101).

Thereafter, similarly, scripts of (94) to (98) are executed. In (94), it is a command for feeding Angelfish, and although it is not contained in the Angel Script of Angelfish, Angelfish inherits the behavior of Fish in the script of (99), and therefore the procedures (105), (106) of Feed Food stored in the system presentation procedure part storage means 34 are executed. In (95), since the behavior of a Rect inherits the behavior of Fish in (92), the procedure of Swim of (100) in the Angel Script is referred to, and hence the command of (101) is executed. The command of (96) exchanges the pointers of the script attached to Angelfish and aRect. In (97), it is a command for resizing Angelfish, but it is not particularly defined in the Angel Script or Fish. However, since Angelfish is an instance of image class, and it execute the processing procedure about resizing of the image stored in the system presentation data part storage means 32. In the command of (98), since scripts of Angelfish and Fish are exchanged in (96), Angelfish behaves like a standard fish.

Figure 28:
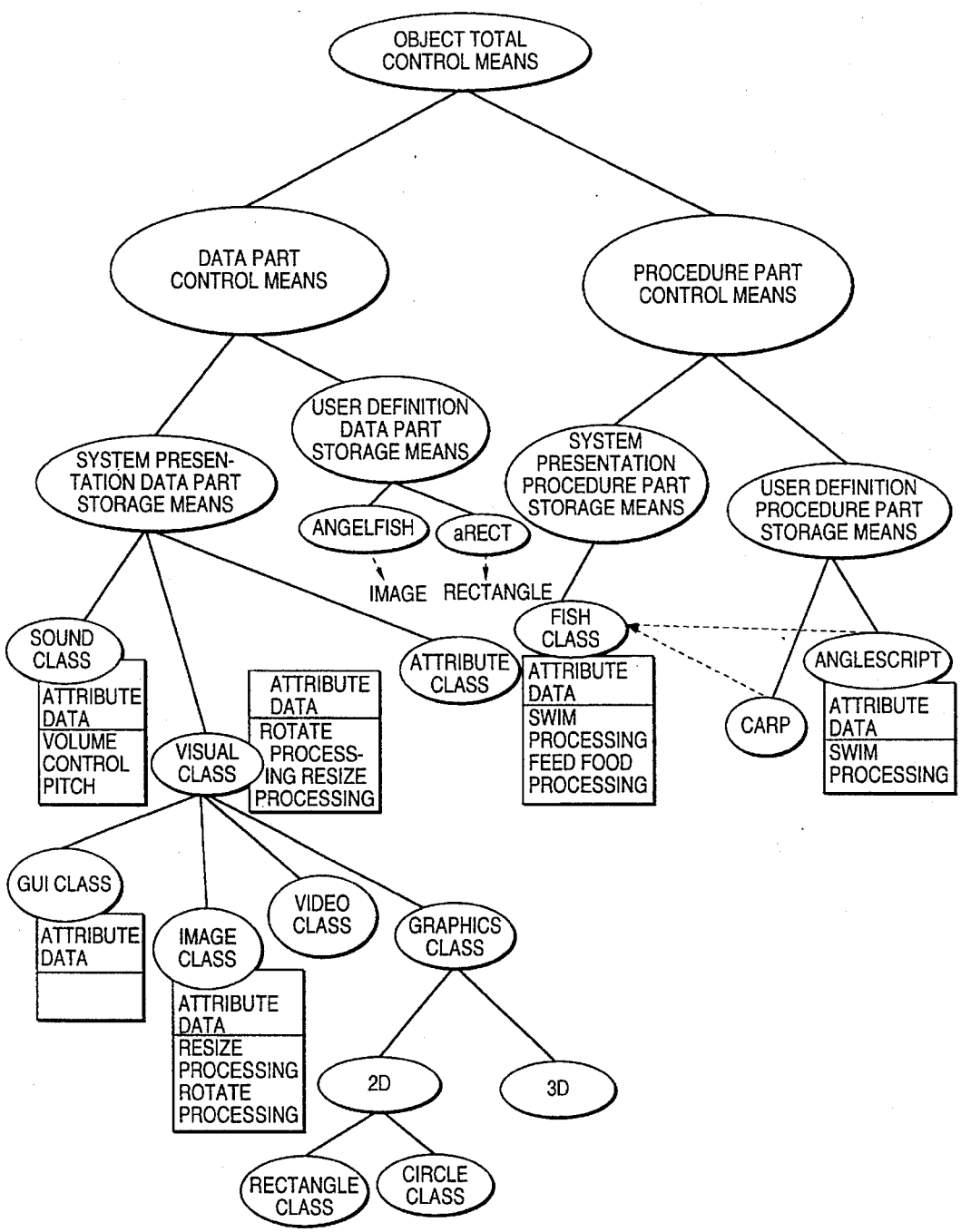
FIG. 28 is an explanatory diagram for explaining an example of object total control means in the seventh embodiment.

Thus, by composing the object storage means in the first embodiment as described above, only when the user creates the scrips very simply, information presentation by complicated multimedia information is realized. Incidentally, FIG. 28 is an auxiliary diagram for explaining the control and storage of the multimedia information in this embodiment.

As described above, according to the invention, by storing the data showing the content of presentation object and conditions about information presentation in the storage means, the information presentation control means controls presentation of each presentation object in parallel, depending on the instructions from outside, status of presentation information, mutual relation of presentation objects, time lapse, or communication status between them and external system.

Accordingly, the conditions about the information presentation may be described independently about each object of presentation, and plural sets of source information having complicated mutual relationship may be easily presented by combination, and it is also effective to present easily the information for free behavior of the presentation objects on time space depending on the interactive manipulation.

Besides, the data showing the content of the presentation objects and conditions about information presentation can be easily stored in the storage means by the data input means, condition input means, or editing means, and such presentation information may be easily created.

Also in the invention, relative time control of each information, independent description of each information, and mutual action between each information may be easily described. In the field of educational software and amusement software, it is particularly effective when applied to the development of presentation software with interactive property and high in audiovisual effect.

It also increases possibility for development of presentation software possessing both hypertext property and video editing character. By introducing the relative time space concept, while handling mutually related information as one body, individual pieces of information may be independently controlled, thus making it possible to develop flexible presentation software.

In this way, it is particularly useful in the field where simulation property, such as educational support of dynamics and mathematics is required.

In the invention, an object-oriented method is used, in which each information has its attribute and manipulation method to itself such as move, deformation, or the like, being combined, inside of itself. By effectively making use of this property, the following two effects are brought about.

First, each piece of information can be handled independently as one unit, and new media can be easily added, so that it is possible to quickly cope with the technical innovations.

Second, the action of each information can be defined independently. Accordingly, it is easy to define mutual actions of information such as collision, and so on, hence development of the presentation software having each data entangled complicatedly which was difficult in the prior art can now be made easily. As a result, in the field of the educational supports of dynamics and mathematics, practicality of the invention is very high.

According to the invention, depending on the execution state of the information presentation, since execution unit of the intermediate language type corresponding to the machine language, as well as the adjustment of event information and adjustment of time control information may be changed flexibly, it is particularly effective when desired to perform animation execution having mechanism for controlling real time processing and of higher precision.

Although it was very difficult in the conventional presentation information creating apparatus, it is easier since the invention has a mechanism for the end user to simply define a new class, a new object attribute, and class hierarchical relation, and extension of system as well as recycling of animation parts once created can be easily made, animation creation which hitherto has been time-consuming, may be made very efficiently.

Furthermore, because of the mechanism of efficiently storing and controlling multimedia information such as text, graphics, image, video and sound, different data may be uniformly handled by the user, and applications using these different data can be created very easily.

What is claimed is:

1. An information presentation apparatus for presenting a plurality of objects according to interactive manipulation, comprising:

an object control means for storing therein a plurality of object data each of which represents an object and is composed of a pair of a data part containing presentation information of at least one of text, graphics, image, video and sound and a processing procedure part containing a procedure for processing the presentation information in the data part and for controlling spatial allocation and moving statuses of the plurality of objects, said object control means for detecting a status change in which one arbitrary object and another arbitrary object come to a predetermined specific relation to each other and producing a change event signal indicative of the detected status change;

interactive processing input means for inputting parameters necessary for the interactive manipulation;

interpretation and execution means for interpreting the parameters and the procedure contained in the processing procedure part of an object data retrieved from the object control means and for executing the procedure;

time control means for producing a timer interrupt signal which occurs at a specific timing;

event control means for producing a status change command in response to the change event signal and for producing the status change command in response to the timer interrupt signal;

information presentation execution means for controlling the object control means and the interpretation and execution means, said information presentation means being responsive to the status change command from the event control means for controlling the object control means so as to activate or deactivate the detection of the status change and the interpretation and execution means so as to change a status of at least one of the plurality of objects, wherein said interpretation and execution means is responsive to the parameters for retrieving an object data from the object control means according to the parameters and for interpreting and executing a procedure contained in the processing procedure part of the retrieved object data, and is responsive to a control by said information presentation execution means for retrieving two or more object data from the object control means according to the status change command and for interpreting and executing procedures contained in the processing procedure parts of the retrieved two or more object data in parallel;

wherein the data part of the object data includes a basic data part presented by the apparatus and a user data part defined by a user based on the basic data part, and the processing procedure part of the object data includes a basic processing procedure part presented by the apparatus and a user processing procedure part defined by the user based on the basic processing procedure part, and wherein said object control means includes:

system presentation data part storage means for storing the basic data part;

user definition data part storage means for storing the user data part;

data part control means for controlling the data parts stored in the system presentation data part storage means and the user definition data part storage means and retrieving a selected data part from one of the system presentation data part storage means and the user definition data part storage means;

system presentation procedure part storage means for storing the basic processing procedure part;

user definition procedure part storage means for storing the user processing procedure part;

procedure part control means for controlling the procedure parts stored in the system presentation procedure part storage means and user definition procedure part storage means and retrieving a selected processing procedure part from one of the system presentation procedure part storage means and the user definition procedure part storage means; and object total control means for controlling the data part control means and the procedure part control means to prepare an object data from the selected data part and the selected processing procedure part retrieved by the data part control means and the procedure part control means, respectively.

2. An apparatus according to claim 1, wherein each of the object control means and the interpretation and execution means produces a time control instruction, and wherein the time control means changes the specific timing of the timer interrupt signal according to the time control instruction from each of the object control means and the interpretation and execution means.

* * * * *